US006193295B1

(12) United States Patent
Stragier

(10) Patent No.: US 6,193,295 B1
(45) Date of Patent: Feb. 27, 2001

(54) REFUSE COLLECTION VEHICLE

(75) Inventor: Marcel G. Stragier, Scottsdale, AZ (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 09/464,924

(22) Filed: Dec. 16, 1999

Related U.S. Application Data

(62) Division of application No. 08/951,998, filed on Oct. 16, 1997, now Pat. No. 6,012,892.

(51) Int. Cl.[7] .......... B62D 33/04

(52) U.S. Cl. .......... 296/56; 296/183; 296/184; 49/254

(58) Field of Search .......... 296/29, 50, 56, 296/183, 191, 187, 203.01, 203.03, 184; 49/254, 255, 256, 257, 258

(56) References Cited

U.S. PATENT DOCUMENTS 3,757,969 * 9/1973 Smith .......... 214/83.3
3,873,149 * 3/1975 Churchman .......... 296/56
3,990,739 * 11/1976 Head .......... 296/56
4,334,633 * 6/1982 Piegza .......... 220/332
4,691,959 * 9/1987 Verner .......... 296/184
4,909,564 * 3/1990 Pfeifer et al. .......... 296/184
5,141,280 * 8/1992 Gerrard .......... 296/152
5,335,958 * 8/1994 Christenson et al. .......... 296/56

FOREIGN PATENT DOCUMENTS

2329263 * 12/1974 (DE) .......... 49/255

* cited by examiner

*Primary Examiner*—D. Glenn Dayoan
*Assistant Examiner*—Patricia Engle
(74) *Attorney, Agent, or Firm*—Parsons & Goltry; Robert A. Parsons; Michael W. Goltry

(57) ABSTRACT

A refuse collection vehicle having a body including an integral outwardly arcuate top panel, a bottom panel, and integral outwardly arcuate side panels. The side panels being directly joined to opposing side edges of the top panel, and cooperating together to bound a chamber for carrying refuse.

21 Claims, 15 Drawing Sheets

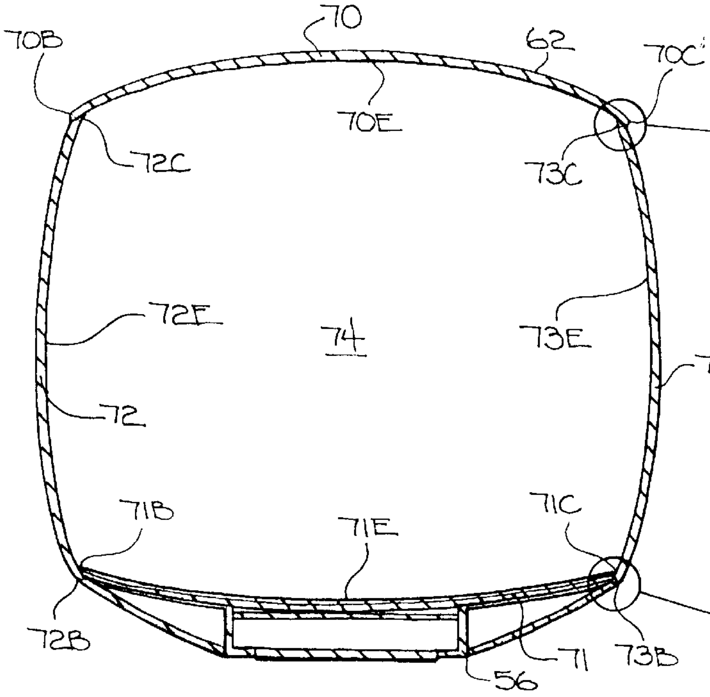
FIG. 5
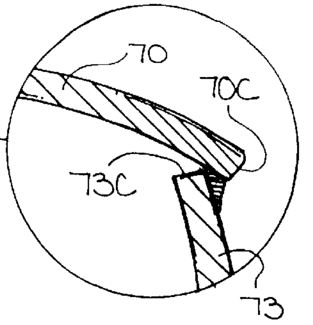
FIG. 6
FIG. 7
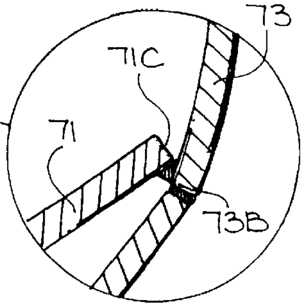
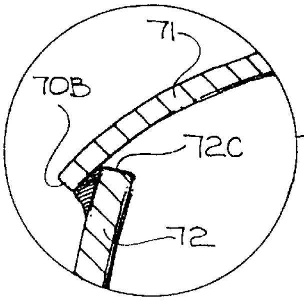
FIG. 9
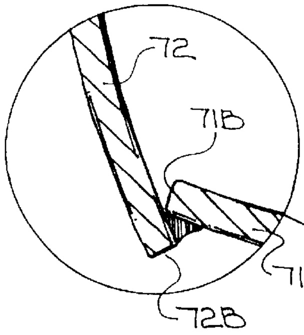
FIG. 10
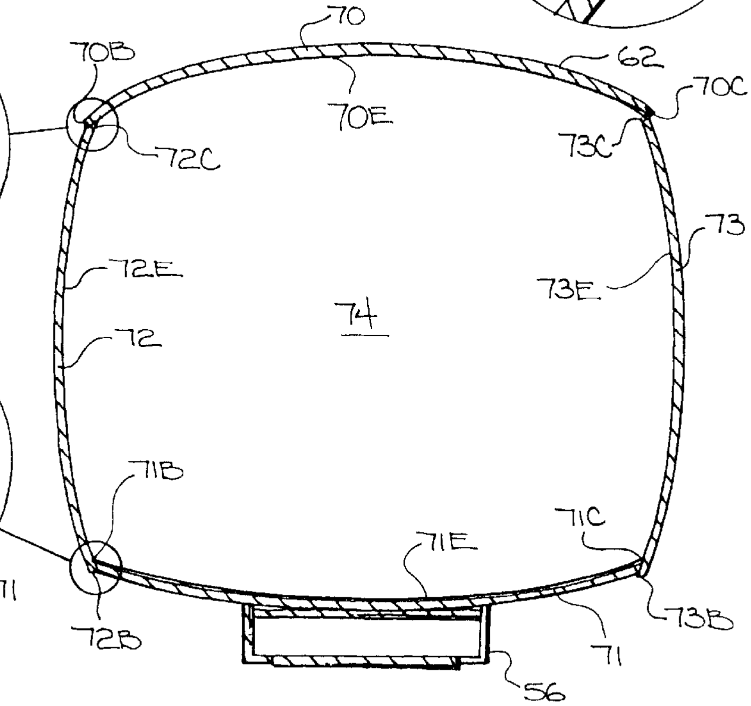
FIG. 8

FIG. 11
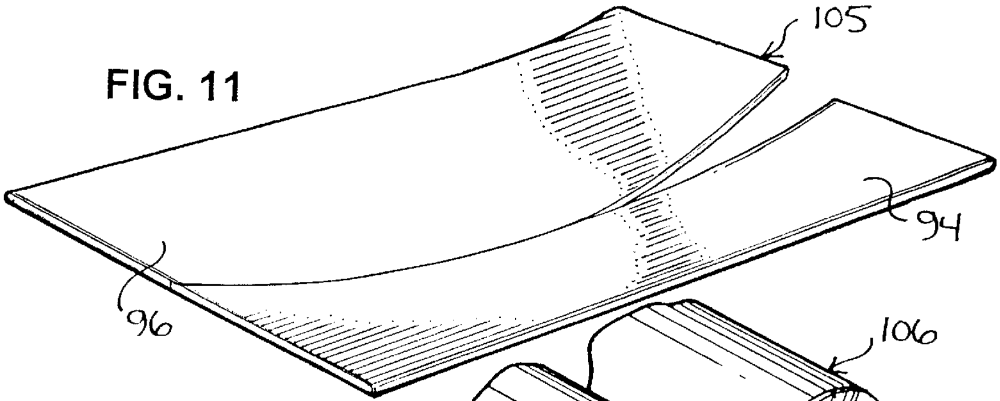
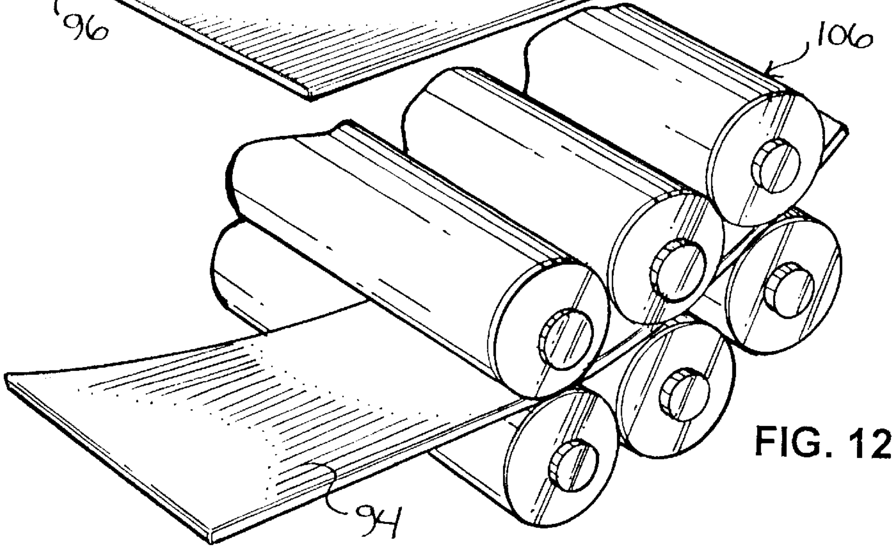
FIG. 12
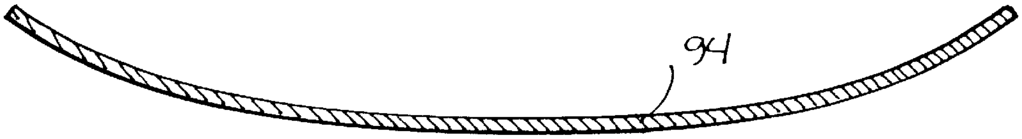
FIG. 13
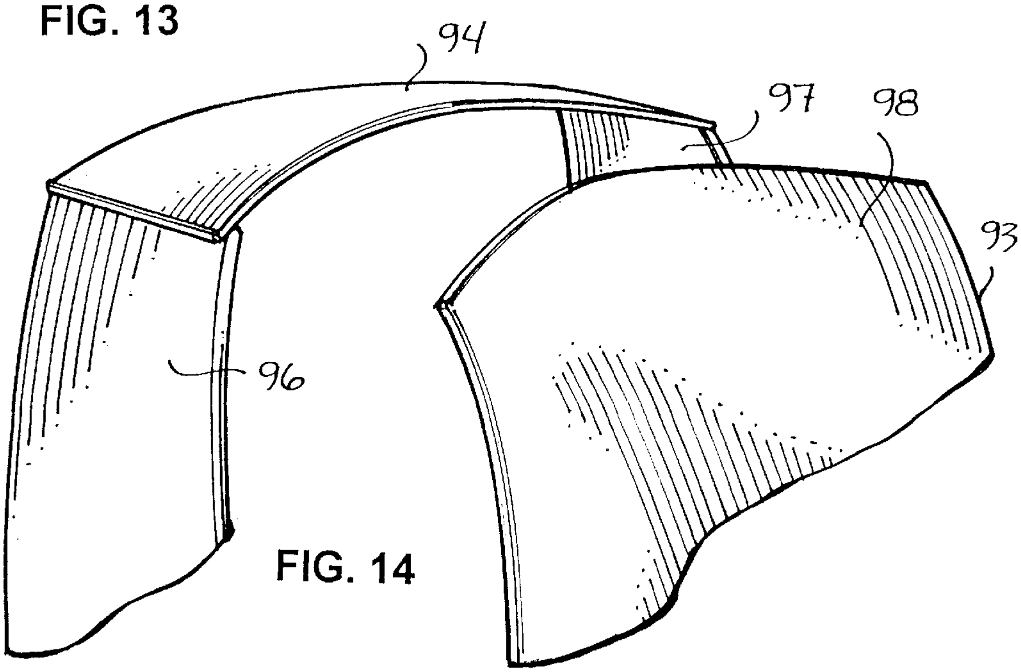
FIG. 14

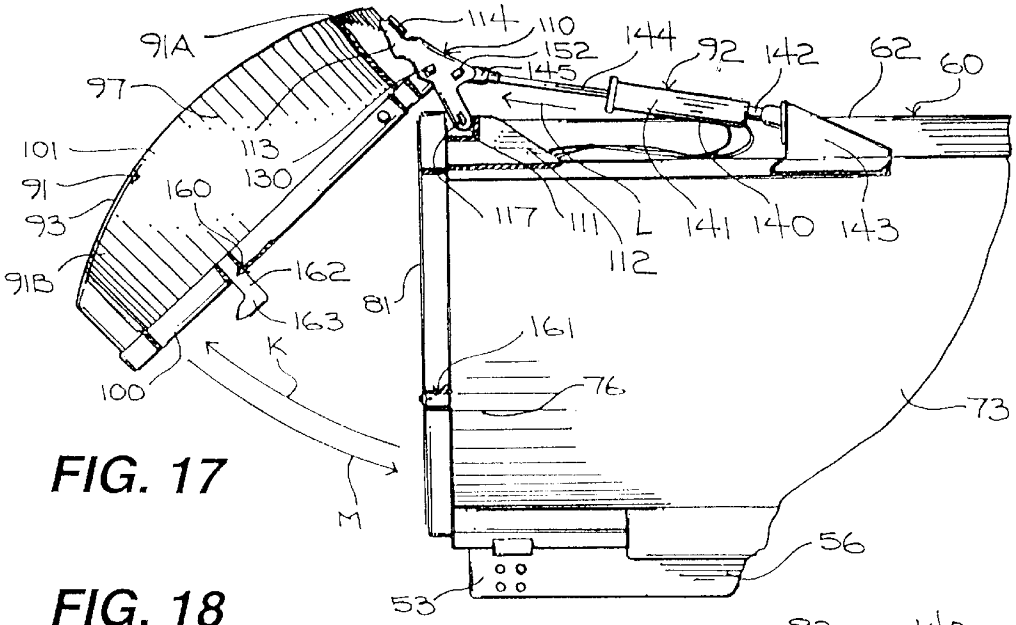
FIG. 17
FIG. 18
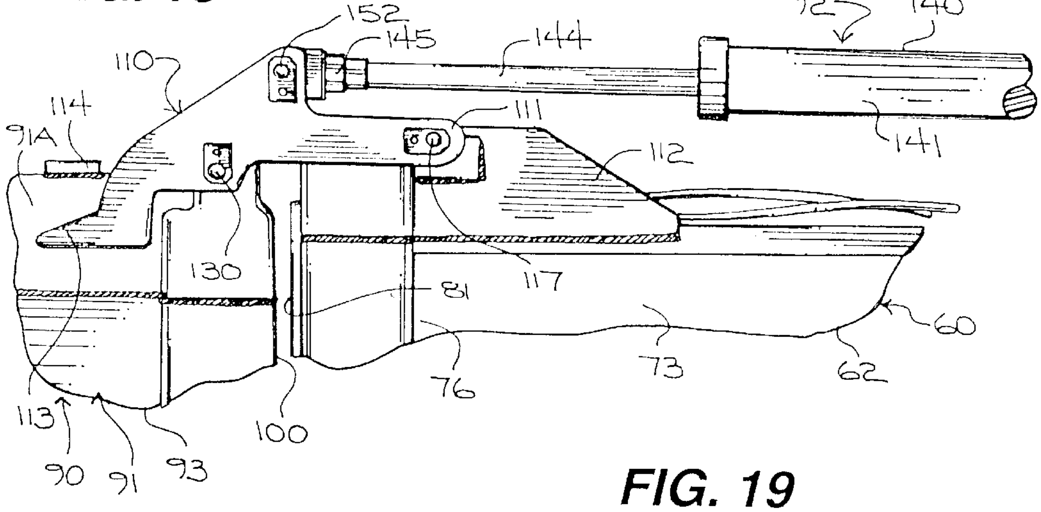
FIG. 19
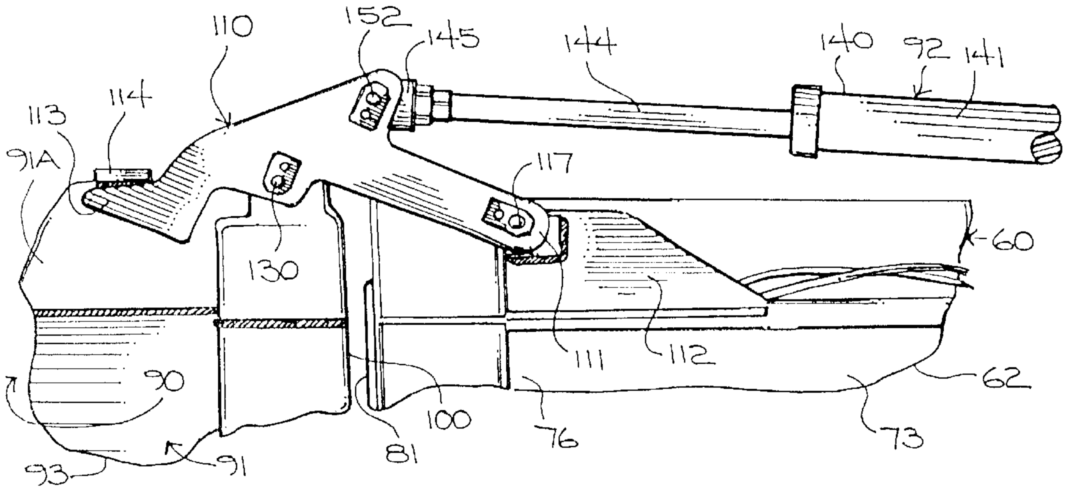

FIG. 28
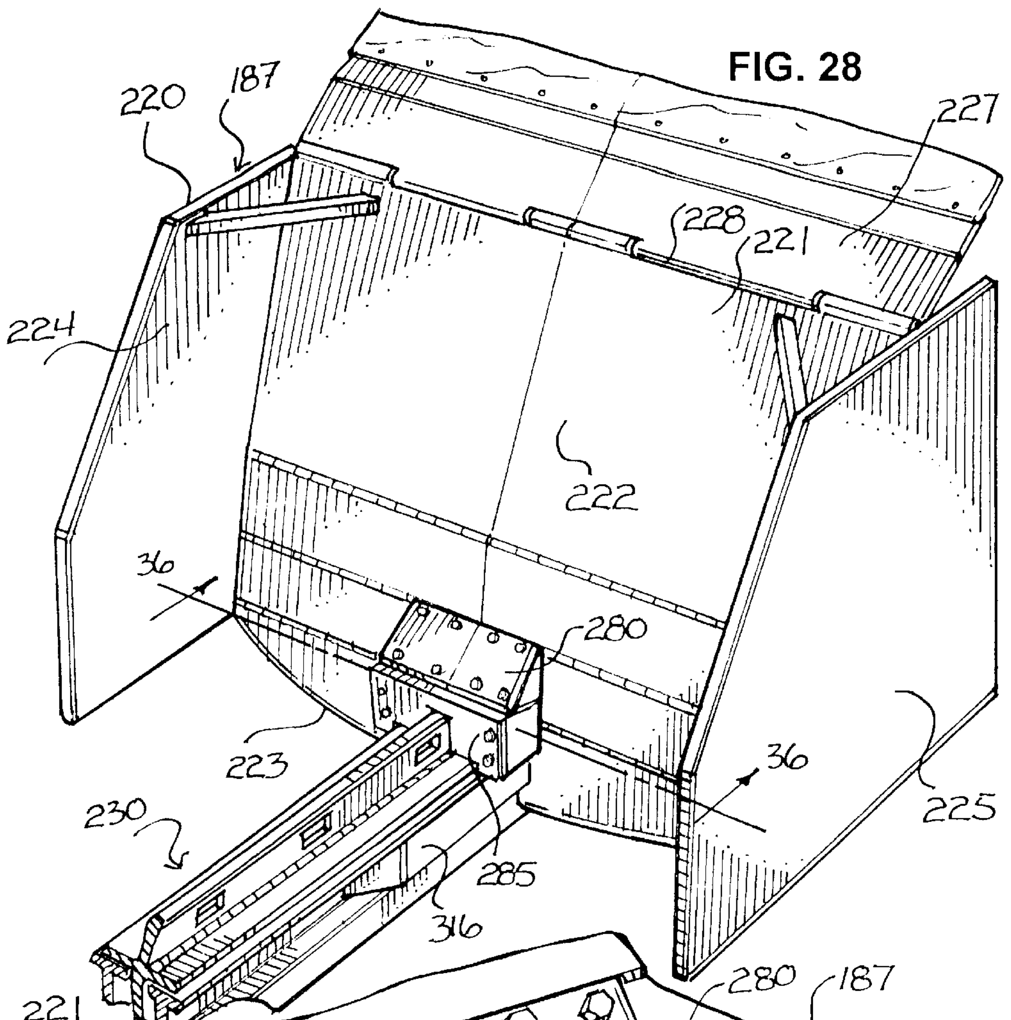
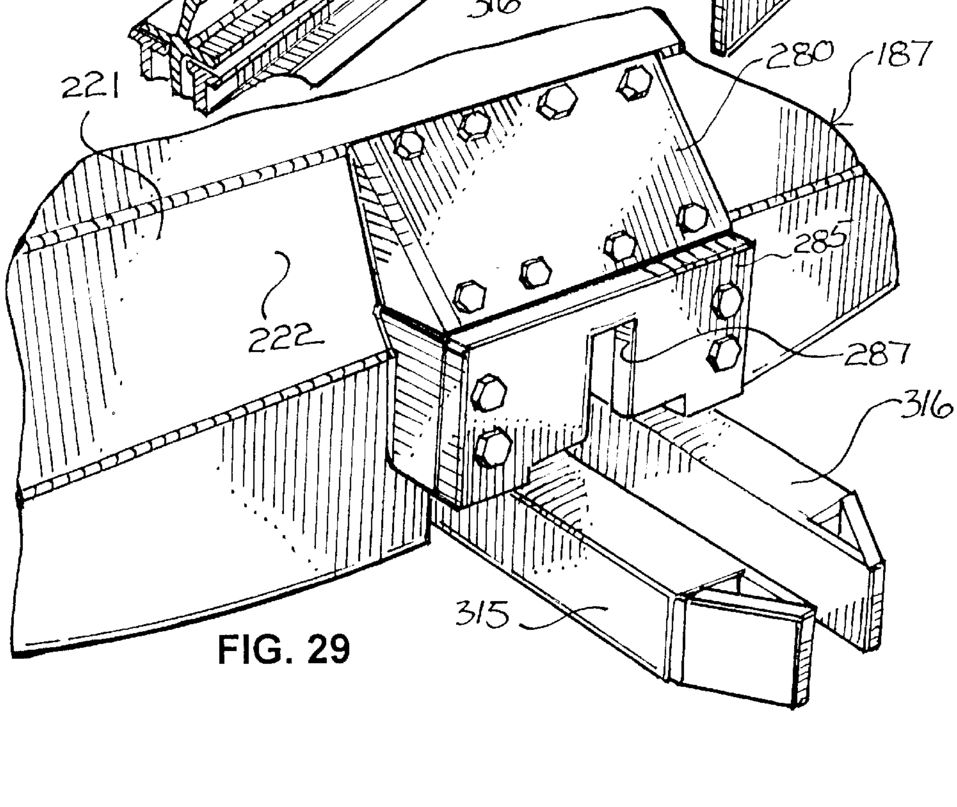
FIG. 29

FIG. 30
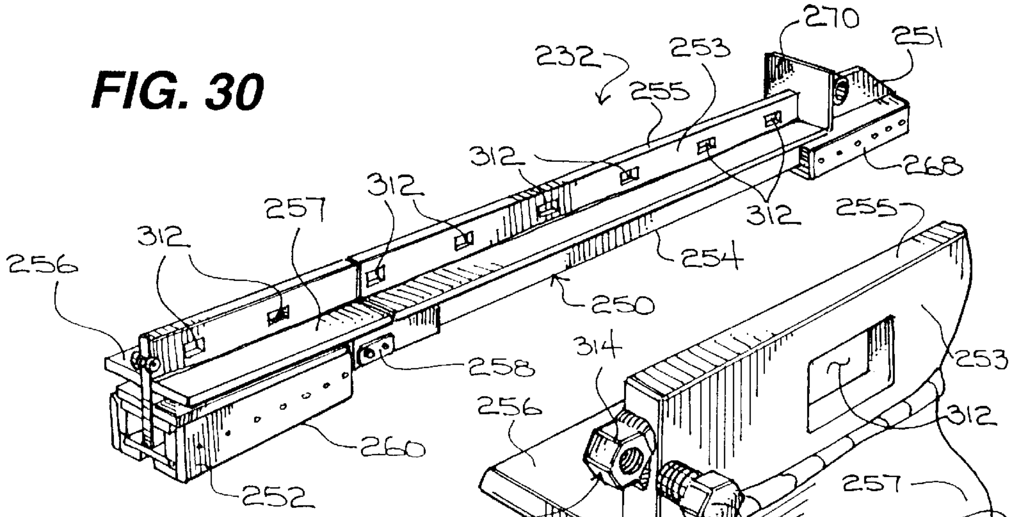
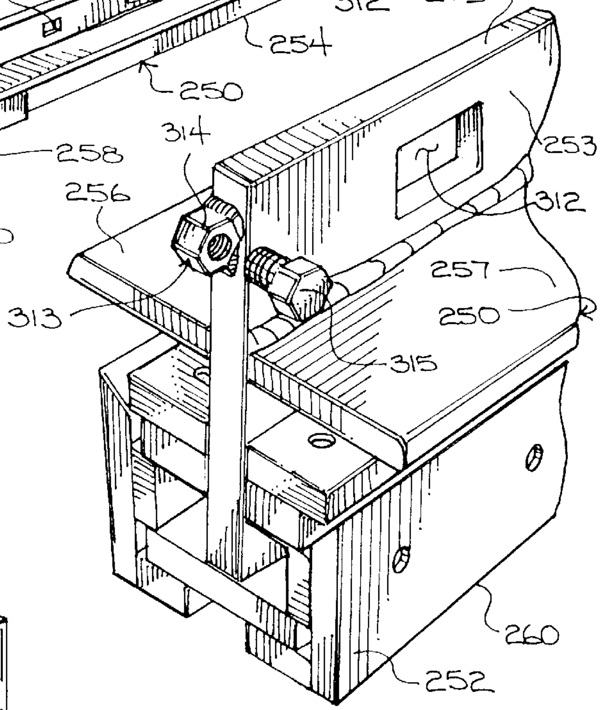
FIG. 31
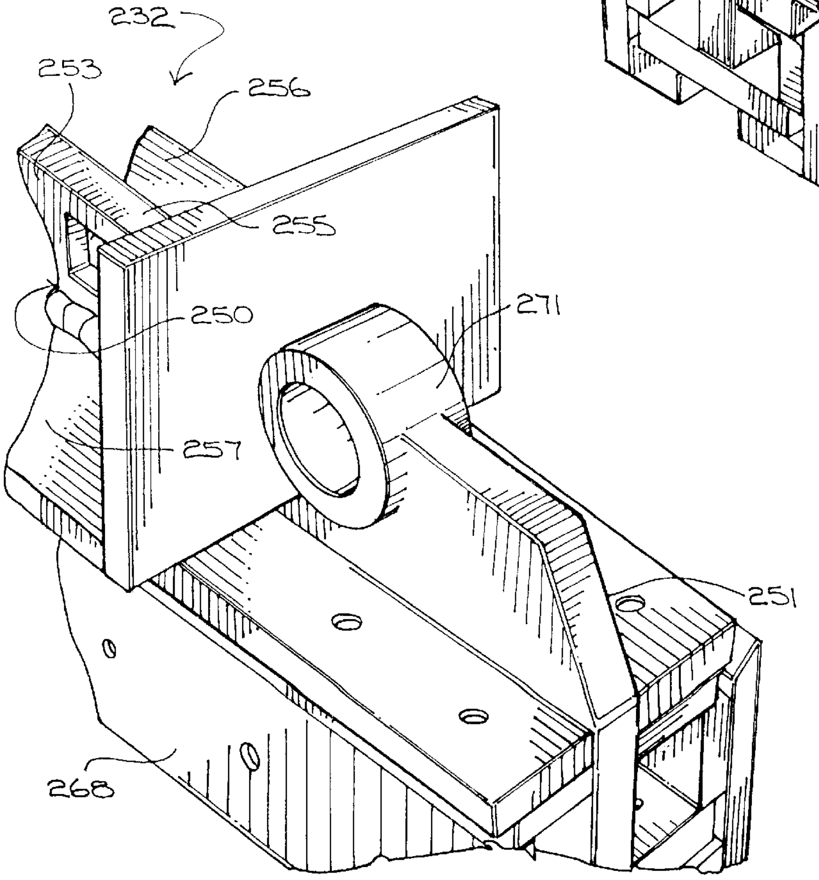
FIG. 32

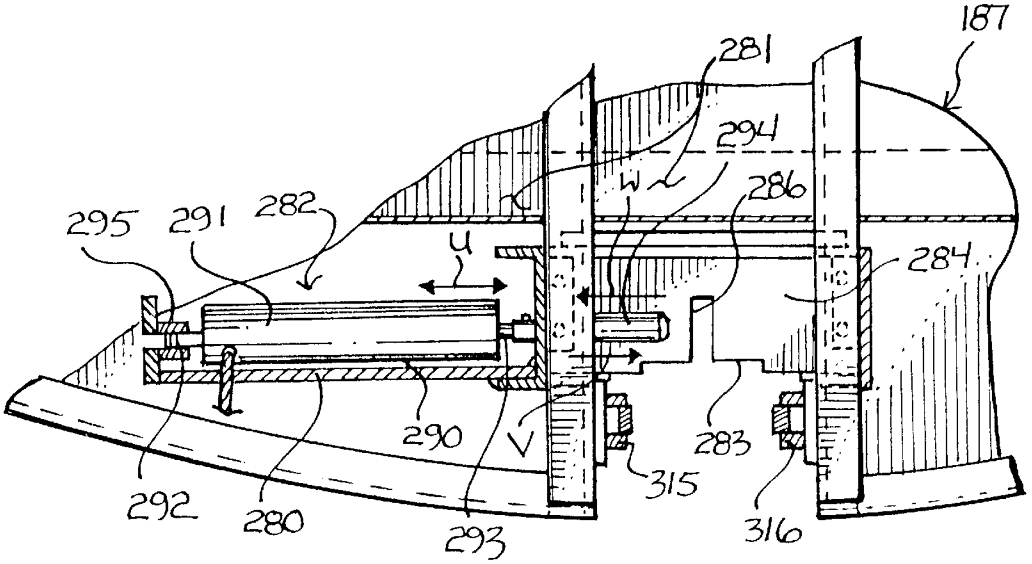
FIG. 36
FIG. 37
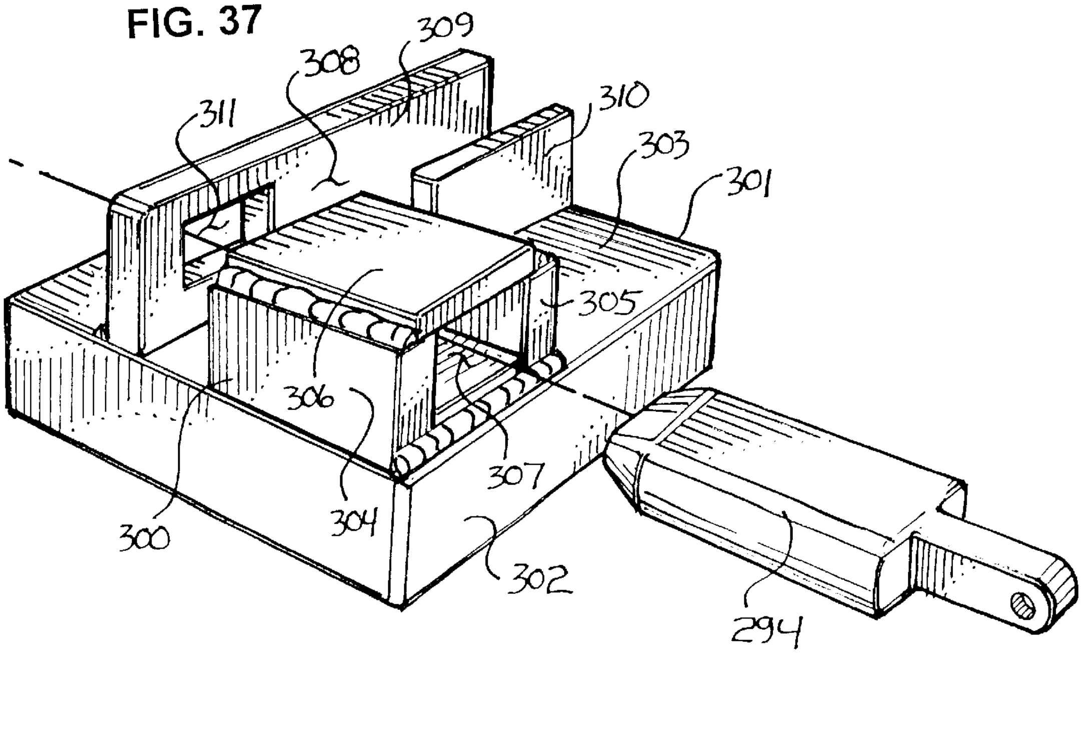

REFUSE COLLECTION VEHICLE

This application is a division, of application Ser. No. 08/951,998, filed Oct. 16, 1997 now U.S. Pat. No. 6,012, 892.

BACKGROUND OF THE INVENTION

1. Field of the Invention

This invention relates generally to the field of refuse handling apparatus.

More particularly, this invention relates to refuse collection vehicles of a type having a hopper for receiving refuse and a storage body for receiving and storing refuse from the hopper.

In a further and more specific aspect, the present invention concerns novel features for the improved control and operation of refuse collection vehicles.

2. Prior Art

The collection and removal of refuse, the solid wastes of a community, is a major municipal problem. For example, residential refuse is generated at an average rate of approximately two pounds per day per capita. As accumulated, loose and uncompacted, the refuse has a density generally in the range of 150–300 pounds per cubic yard. For the health and welfare of the community, regular disposal is essential.

Traditionally, residential refuse including garbage, trash and other waste materials was amassed and stored in containers having a ten to thirty gallon capacity. On a regular basis, normally once or twice weekly, the containers were placed by the householder at a designated location for handling by a scheduled collection agency. Frequently designated locations were curbside and alley line. Not uncommonly, the refuse of a single residence, depending upon the number of occupants and the frequency of service, would occupy two or more containers each weighing as much as seventy-five to one hundred pounds.

This conventional refuse collection method subsisted for many years and involved a mechanized unit supplemented with manual labor. The mechanized unit, or collection vehicle, included a refuse handling body mounted upon a truck chassis. Generally, the vehicle was attended by a crew of three or more. One of the crew attended to operation of the vehicle while the others brought the householder's refuse to the vehicle.

Commonly, the vehicle included a hopper of conveniently low loading height into which the collectors emptied the containers. Means were provided for transferring the refuse from the hopper to the body. The body, which was typically equipped with a compactor, also included unloading means for ejecting refuse at the disposal site.

Considerable effort has been directed by many in the industry of refuse collection toward the development of equipment for the enhancement of the traditional refuse collection method. As result, current methodology directs that refuse is placed in relatively large containers of uniform dimensions which are handled by automated equipment. The containers may, for example, be of sufficient size to service several households. The collection vehicle is equipped with a self-loading device which lifts and dumps the container. Increased load carrying capacity of the vehicle is achieved through the use of compactor-type bodies.

Innovators and researchers in the art have not, however, reached any semblance of accord on the specifics of mechanizing the collection of refuse. Accordingly, the art has rapidly swelled and is continuing to swell with numerous proposals which purportedly offer optimum solutions. For instance, while there is general agreement upon the desirability of the compactor-type body, the art vacillates among various reciprocating platen and auger-type packer mechanisms. Loading is alternately accomplished by front, side or rear mounted mechanisms which may incorporate either fixed or extendible length arms. Numerous other disagreements and divergences permeate the art.

The many prior art proposals, however, have not provided entirely satisfactory solutions to the automated collection of refuse. Because prior art reciprocating packers are normally operational in only one direction normally defined as the forward stroke, the rearward or return stroke constitutes wasted motion and wasted time. Furthermore, dumping of the container must be coordinated to prevent the accumulation of the material at the rearward or backside of the platen. While the auger provides continuous operation, it is at the expense of increased manufacturing costs and decreased reliability. Subjected to unequal forces and having bearings at only one end, the device can be wedged to a stop. It is seen, therefore, that each is subject to periodic malfunction requiring attendance by the operator and temporarily halting the collection of refuse.

With the increased size of the containers, the storage bodies of most refuse collection vehicles have also grown to accommodate larger loads. However, practitioners in the field have been faced with the technological necessity of making the large storage bodies strong enough to accommodate not only the weight of the refuse but also the force exerted against the storage body as the refuse is compacted into the storage body from the hopper. To this end, the walls of present storage containers are quite bulky and normally either corrugated or otherwise include vertical and/or horizontal bracing elements welded to the walls to rigidify and strengthen the walls. Not only are corrugated walls and walls having vertical and/or horizontal braces exceedingly expensive to construct and heavy, they also diminish the general exterior appearance of the storage body and the aerodynamic quality of the refuse collection vehicle which correspondingly decreases the gas mileage of the refuse collection vehicle during normal operation increasing the cost of operating tie vehicle.

To further enhance the automated collection of refuse, many storage containers incorporate a gate assembly mounted with a rearward opening thereof to act as a closure for the rearward opening. These gate assembly apparatus are normally bulky and incorporate complex mechanical features for locking and unlocking the gate assembly with the rearward opening. However, the accessible rearward opening allows refuse collected within the storage container to be ejected from the rearward opening. To this end, apparatus currently exist for either tilting the storage body upwardly for allowing gravity to move the refuse from the storage body and outwardly through the rearward end for deposit, or ejecting the refuse outwardly through the rearward end. To eject the refuse outwardly through the rearward end of the storage body, innovators have adapted packing mechanisms which operate for not only transferring and packing refuse into the storage body from the hopper, but also for ejecting the refuse outwardly through the rearward end for deposit at suitable waste disposal sites. Although exemplary for intended use, these packing mechanisms are extremely bulky, mechanically inefficient and costly.

It would be highly advantageous, therefore, to remedy the foregoing and other deficiencies inherent in the prior art.

Accordingly, it is an object of the present invention to provide improvements in refuse collection equipment.

Another object of the present invention is the provision of an improved storage body which is light, strong and capable of transporting large loads of refuse.

And another object of the present invention is to provide an improved storage body that is easy to construct.

Still another object of the present invention is to provide an improved storage body that is inexpensive to construct.

Yet another object of the instant invention is to provide an improved continuously operable packer assembly.

Yet still another object of the instant invention is to provide an improved packer assembly operative for facilitating the incremental movement of a platen into and through a hopper and a storage body for accomplishing not only the compaction of refuse into the storage body but also the ejection of the refuse through a downstream opening of the storage body for deposit.

And a further object of the invention is to provide an improved self-locking gate assembly.

Still a further object of the immediate invention is to provide an improved self-locking gate assembly that is easy to construct.

Yet a further object of the invention is to provide an improved self-locking gate mechanism that is efficient and easy to operate.

And still a further object of the invention is the provision of a refuse collection vehicle of the foregoing type which is safer, easier and more economical to operate than conventional prior art refuse collection equipment.

SUMMARY OF THE INVENTION

Briefly, to achieve the desired objects of the instant invention in accordance with a preferred embodiment thereof, provided is a vehicle for collecting refuse. The vehicle is generally comprised of a chassis, a body mounted with the chassis for receiving refuse through an opening thereof, a packer assembly for moving refuse into the body through the opening, and a gate assembly mounted to serve as a closure for another opening of the body and movable between a normal closed position and an open position.

In a preferred embodiment, the body is generally comprised of an integral outwardly arcuate top panel, a bottom panel and integral outwardly arcuate side panels cooperating together to bound a chamber for carrying refuse. The panels include forward edges bounding the opening into the chamber for receiving refuse therethrough and rearward edges bounding the other opening into the chamber. One of the integral outwardly arcuate side panels includes a side edge coupled with the integral outwardly arcuate top panel at a point adjacent to and generally underlying a side edge of the top panel to define an upper corner of the body. The other of the integral outwardly arcuate side panels includes a side edge coupled with the integral outwardly arcuate top panel at a point adjacent to and generally underlying another side edge of the top panel to define another upper corner of the body. Furthermore, the bottom panel includes a side edge coupled with one of the integral outwardly arcuate side panels at a point adjacent to and generally overlying a side edge of the one of the integral outwardly arcuate side panels to define a lower corner of the body. The bottom panel further includes another side edge coupled with the other one of the integral outwardly arcuate side panels at a point adjacent to and generally overlying a side edge of the other one of the integral outwardly arcuate side panels to define another lower corner of the body.

Regarding another preferred embodiment, the gate assembly is generally comprised of a closure element mounted to serve as a closure for the other opening of the body and movable from a normal closed position to an open position, and from the open position to the normal closed position, the closure element having an inner end to enclose the other opening of the body in the normal closed position. Further included is an engagement assembly carried by the closure element and a complemental engagement assembly carried by the body, the engagement assembly being detachably engagable with the complemental engagement assembly in the normal closed position of the closure element. Motive means are also provided for moving the closure element from the normal closed position to the open position along general ascending traverse to disengage the engagement assembly from the complemental engagement assembly and for moving the closure element along general ascending pivotal traverse for disengaging the inner end of the closure element from the other opening of the body, and for moving the closure element from the open position to the normal closed position along general descending pivotal traverse for engaging the inner end of the closure element with the other opening of the body and for moving the closure element along general descending traverse to engage the engagement assembly with the complemental engagement assembly in the normal closed position of the closure element.

The motive means may include one or a plurality of drive assemblies disposed in spaced relation. Each drive assembly includes a stop carried by the closure element, a linkage element pivotally mounted with the body and the closure element, and actuating means for moving the linkage element along general ascending pivotal traverse relative the body for moving the closure element from the closed position along general ascending traverse to disengage the engagement assembly from the complemental engagement assembly with the linkage element to subsequently engage the stop for imparting movement of the closure element along general ascending pivotal traverse disengaging the inner end of the closure element from the other opening of the body and moving the closure element to the open position, and for moving the linkage element in general descending pivotal traverse relative the body from the open position of the closure element for moving the closure element in general descending pivotal traverse to engage the inner end of the closure element with the other opening of the body with the linkage element to subsequently disengage the stop for moving the closure element in general descending traverse to engage the engagement assembly with the complemental engagement assembly in the normal closed position of the closure element.

The actuating means of the present invention may include a hydraulic cylinder assembly having an inner end pivotally mounted with the body and an outer end mounted with the linkage element, such that upon actuation of the hydraulic cylinder assembly, the closure element may be moved alternately between the normal closed and open positions. The hydraulic cylinder assembly may be comprised of a cylinder having the inner end mounted with the body, and an operating rod mounted partially within the cylinder for movement in reciprocal directions and terminating with the outer end mounted with the linkage element, an extended orientation of the operating rod corresponding to the normal closed position of the closure element and a retracted orientation of the operating rod corresponding to the open position of the closure element.

Regarding another embodiment of the present invention, the packer assembly is generally comprised of a platen mounted with the body to urge refuse into the body through the opening, a linkage assembly including a first linkage element and a pivotally connected second linkage element, the first linkage element having an end mounted with the body and the second linkage element having an end mounted to move the platen, and motor means for selectively varying the angular displacement between the first linkage element and the second linkage element of the linkage assembly for moving the platen in reciprocal directions. The motor means may include a hydraulic drive assembly mounted with the body and the first linkage element, the linkage assembly movable in reciprocal directions upon actuation of the hydraulic drive assembly for moving the platen in reciprocal directions.

The hydraulic drive assembly of the packer assembly may be comprised of a cylinder having an end mounted with the body, and an operating rod mounted partially within the cylinder for movement in reciprocal directions, the linkage assembly movable in reciprocal directions upon actuation of the operating rod in reciprocal directions. The end of the operating rod is preferably but not essentially mounted with the first linkage element intermediate the end thereof and the point of pivotal attachment of the first linkage element with the second linkage element. Furthermore, the first linkage element may include a pair of elongate arms each having an end pivotally mounted with the body for pivotal movement and cooperating together to define the end of first linkage element, the pair of elongate arms extending in converging relation to pivotally mount with the second linkage.

The platen of the present invention may be mounted with a carriage assembly if desired. In this regard, the carriage may be comprised of a carriage mounted with the body and a carrier element carried by the carriage for movement in reciprocal directions, the platen carried by the carrier element. The end of the second linkage element of the linkage assembly may be mounted to the carrier element for moving the carrier element in reciprocal directions in response to actuation of the hydraulic drive assembly.

Further included is an engagement means for selectively and detachably securing the platen to the carrier element to facilitate movement of the platen in reciprocal directions at selected locations along substantially the entire length of the carrier element. Also, the end of the second linkage element may be preferably mounted to the carrier element at a point generally spaced from the platen.

The engagement means of the present invention may include a plurality of spaced engagement elements formed along substantially the entire length of the carrier element, and a complemental engagement element carried by the platen and selectively and detachably engagable with selected ones of the plurality spaced engagement elements for detachably engaging the platen to the carrier element at predetermined and selected locations along substantially the entire length of the carrier element. Each one of the plurality of spaced engagement elements may include an aperture formed through the carrier element. In this regard, the complemental engagement element may include a pin detachably receivable within selected ones of the plurality of apertures.

Consistent with the foregoing, associated methods may also be provided.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 5 illustrates a sectional view taken along line 5—5 of FIG. 2, in accordance with a preferred embodiment of the present invention;

FIG. 6 illustrates an enlarged sectional view of an upper corner of the storage body of FIG. 5, in accordance with a preferred embodiment of the present invention;

FIG. 7 illustrates an enlarged sectional view of a lower corner of the storage body of FIG. 5, in accordance with a preferred embodiment of the present invention;

FIG. 8 illustrates a view very similar to the view of FIG. 5, in accordance with a preferred embodiment of the present invention;

FIG. 9 illustrates an enlarged sectional view of another upper corner of the storage body of FIG. 8, in accordance with a preferred embodiment of the present invention;

FIG. 10 illustrates an enlarged sectional view of another lower corner of the storage body of FIG. 8, in accordance with a preferred embodiment of the present invention;

FIG. 11 illustrates a perspective view of a pair of panels of the closure element shown in FIG. 4 being formed from a single sheet of material, in accordance with a preferred embodiment of the present invention;

FIG. 12 illustrates a perspective view of one of the panels of FIG. 11 being formed through a roller assembly, in accordance with a preferred embodiment of the present invention;

FIG. 13 illustrates a vertical longitudinal sectional view of the panel of FIG. 12, in accordance with a preferred embodiment of the present invention;

FIG. 14 illustrates a fragmented perspective view of a plurality of panels of the closure element of FIG. 4 shown as they would appear during assembly, in accordance with a preferred embodiment of the present invention;

FIG. 17 illustrates a view somewhat similar to the view of FIG. 15 with the closure element of the gate assembly shown as it would appear in an open position, in accordance with a preferred embodiment of the present invention;

FIG. 18 illustrates an enlarged side elevational view of the drive assembly of FIG. 15, in accordance with a preferred embodiment of the present invention;

FIG. 19 illustrates a view very similar to the view of FIG. 18, in accordance with a preferred embodiment of the present invention;

FIG. 28 illustrates a perspective view of the platen carried by the carriage assembly in accordance with FIG. 26, the platen further including a housing located centrally for receiving the carriage assembly, in accordance with a preferred embodiment of the present invention;

FIG. 29 illustrates an enlarged fragmented perspective view of the platen of FIG. 28, in accordance with a preferred embodiment of the present invention;

FIG. 30 illustrates a perspective view of a carrier element of the carriage assembly first illustrated in combination with FIG. 26, in accordance with a preferred embodiment of the present invention;

FIG. 31 illustrates an enlarged fragmented perspective view of a rearward end of the carrier element of FIG. 30, in accordance with a preferred embodiment of the present invention;

FIG. 32 illustrates an enlarged fragmented perspective view of a forward end of the carrier element of FIG. 30, in accordance with a preferred embodiment of the present invention;

FIG. 36 illustrates a sectional view taken along line 36—36 of FIG. 28, in accordance with a preferred embodiment of the present invention; and FIG. 37 illustrates a fixture and a pin of an engagement assembly operative for detachably engaging the carriage assembly of the present invention to the platen, in accordance with a preferred embodiment of the present invention.

DETAILED DESCRIPTION OF THE PREFERRED EMBODIMENT

Figure 1:
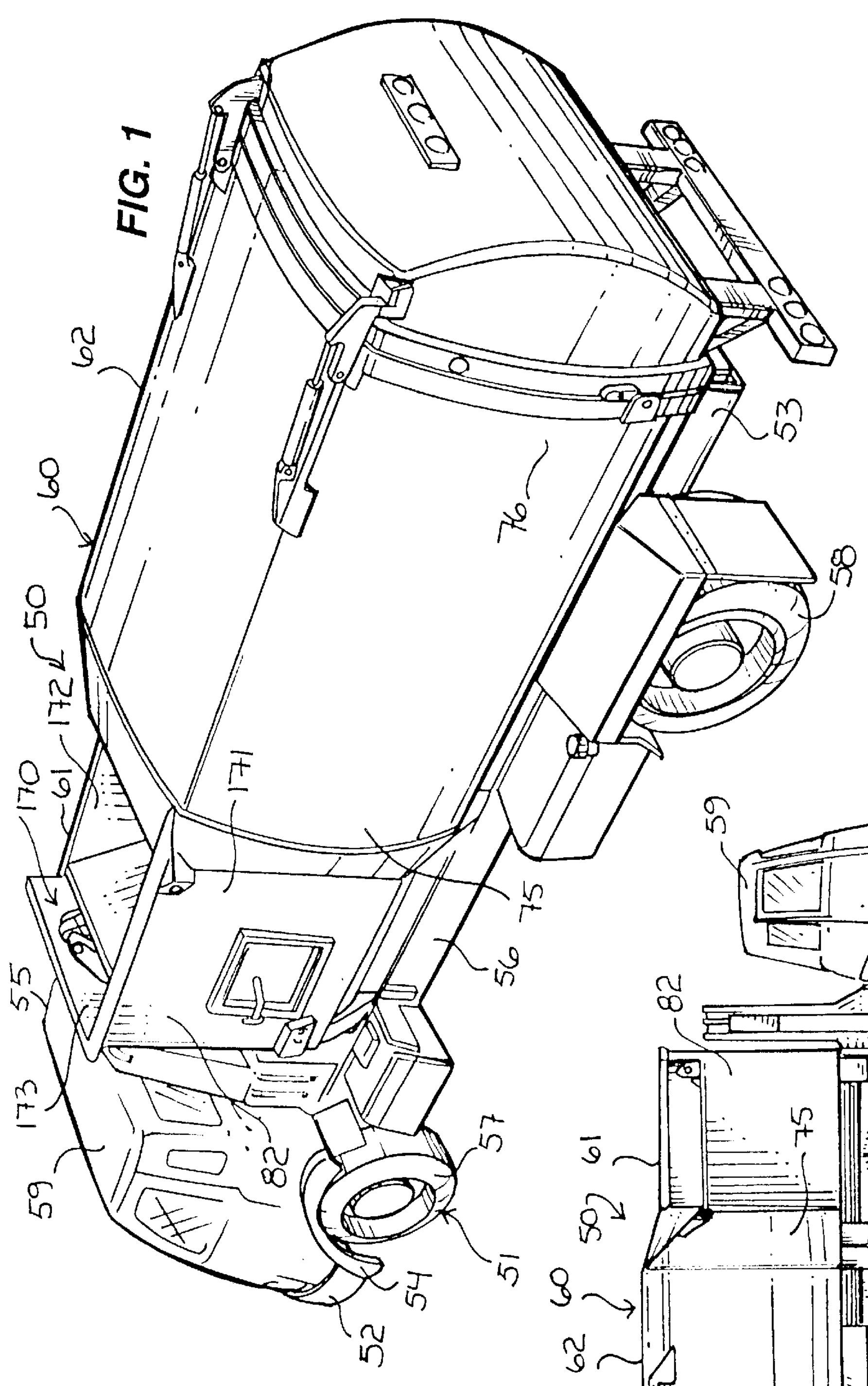
FIG. 1 illustrates a perspective view of a vehicle for collecting refuse including a hopper mounted with a body for receiving refuse and a storage body mounted with the body for receiving and storing refuse from the hopper and having a gate assembly including a closure element mounted with a downstream end of the storage body to serve as a closure for the downstream end of the storage body, in accordance with a preferred embodiment of the present invention.

Turning now to the drawings, in which like reference characters indicate corresponding elements throughout the several views, attention is first directed to FIG. 1 illustrating a perspective view of a vehicle for collecting refuse generally designated by the reference character 50. Vehicle 50 is of a type generally including a body or chassis 51, which, for the purposes of the ensuing discussion, is considered to have a forward end 52, a rearward end 53, a left or street side 54 and a right or curb side 55. Chassis 51 includes a frame 56 supported above ground level by front wheels 57 and rear wheels 58. In accordance with conventional practice, front wheels 57 are steerable and provide directional control for vehicle 50. Similarly, although not herein specifically shown, rear wheels 58 are caused to rotate in response to a conventional engine, transmission and drive train for propulsion of vehicle 50. A cab 59 carried at forward end 52 of chassis 51 provides for an enclosed driver's compartment including the conventional controls associated with the manipulation of chassis 51 as well as conventional controls associated with the loading and compacting equipment.

The foregoing description of vehicle 50 set forth for the purposes of orientation and reference in connection with the ensuing discussion of preferred embodiments of the instant invention is intended to be generally representative of typical, prior art, commercially available vehicles of the foregoing type for collecting refuse. Accordingly, further details not specifically set forth and described will readily occur to those having regard toward the relevant art.

Figure 1A:
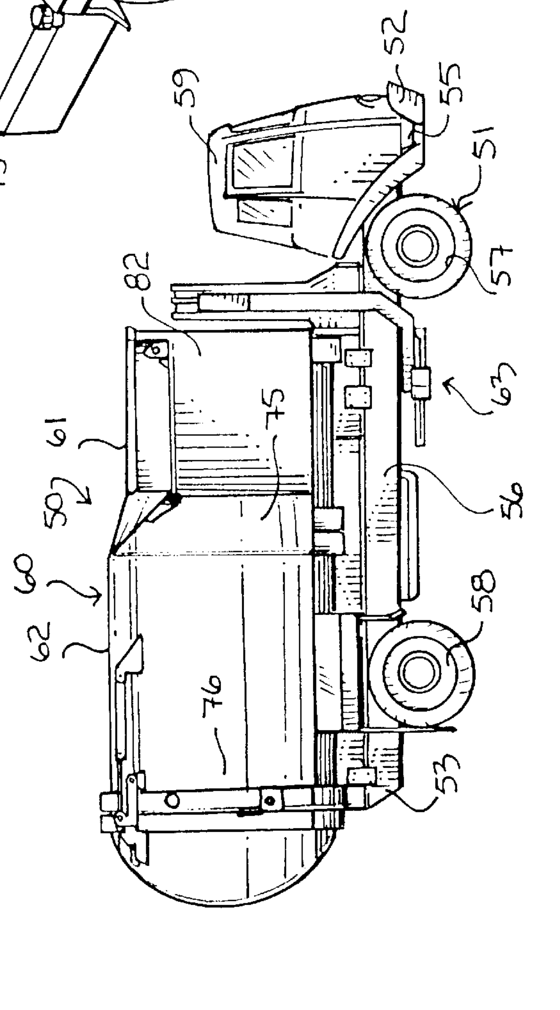
FIG. 1A illustrates a side elevational view of the vehicle of FIG. 1, in accordance with a preferred embodiment of the present invention.

Consistent with the foregoing, vehicle 50 further includes a body 60 carried by frame 56 of chassis 51 rearward of cab 59 and further located upon the rearward portion of frame 56. Body 60 is comprised of a hopper 61 and a storage body 62. Hopper 61, located rearwardly of cab 59 and forwardly of storage body 62, includes means for compacting and stowing refuse within storage body 62, specific details of which will be discussed as the detailed description ensues. In this regard, and with momentary attention directed to FIG. 1A illustrating a curb-side elevational view of vehicle 50, vehicle 50 further includes a container handling apparatus, generally designated by the reference character 63, operative for lifting a refuse container and dumping the contents thereof into hopper 61. Container handling apparatus 63 has been set forth for the purposes of orientation and reference in connection with the ensuing discussion of preferred embodiments of the present invention and is intended to be generally representative of typical, prior art, commercially available container handling apparatus commonly found upon vehicles of a type for collecting refuse. Accordingly, further details of container-handling apparatus 63 will not be herein specifically addressed as they will readily occur to the skilled artisan.

Figure 2:
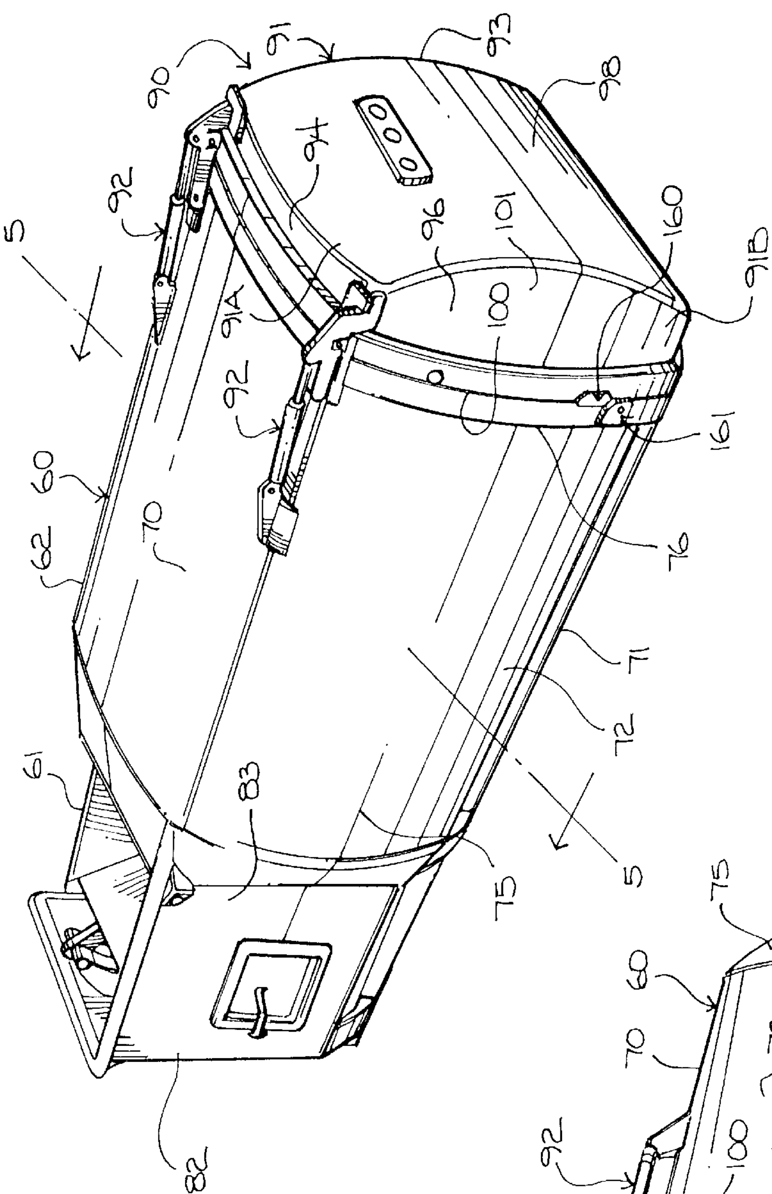
FIG. 2 illustrates a perspective view of the hopper, the storage body and the gate assembly of FIG. 1, in accordance with a preferred embodiment of the present invention.
Figure 3:
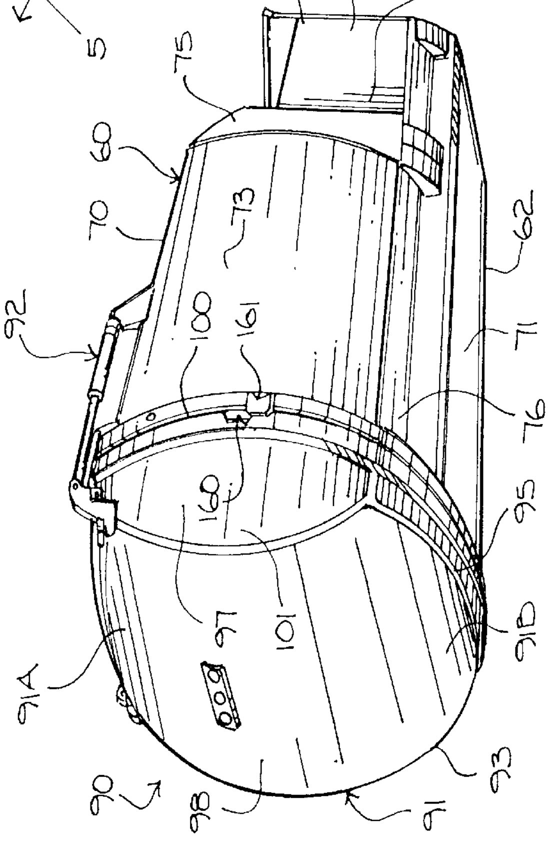
FIG. 3 illustrates another perspective view of the hopper, the storage body and the gate assembly of FIG. 1, in accordance with a preferred embodiment of the present invention.
Figure 4:
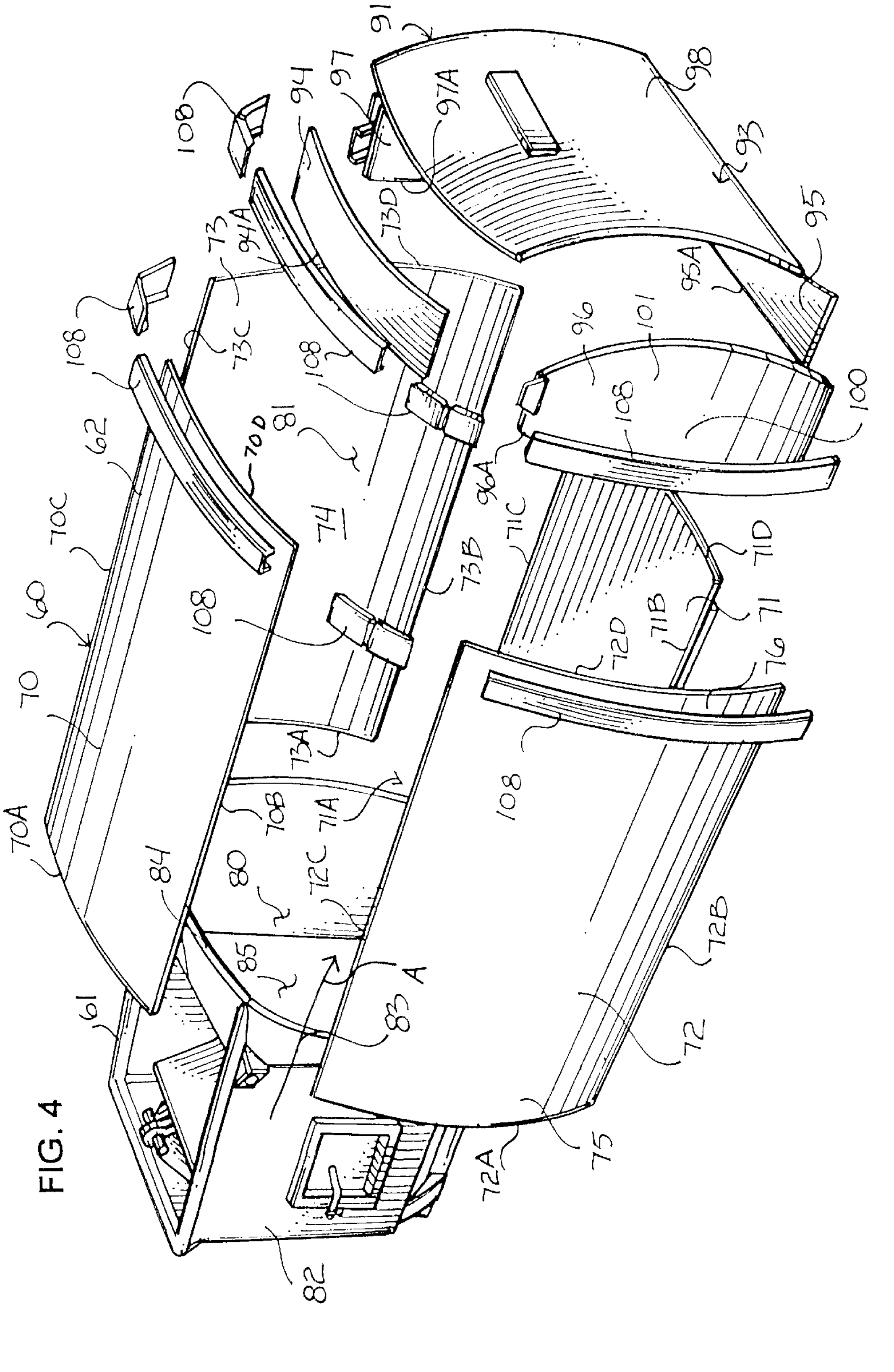
FIG. 4 illustrates an exploded perspective view of the hopper, the storage body and the closure element of the gate assembly of FIG. 1, in accordance with a preferred embodiment of the present invention.

With attention directed to FIG. 2 and FIG. 3 illustrating perspective views of body 60 and FIG. 4 illustrating a partial exploded perspective view of body 60, storage body 62, preferably constructed of steel or other suitable material having similar structural and functional characteristics, is generally comprised of an integral outwardly arcuate top panel 70, an integral outwardly arcuate bottom panel 71 and integral outwardly arcuate side panels 72 (FIG. 2 and FIG. 4) and 73 (FIG. 3 and FIG. 4) cooperating together to bound a chamber 74 (shown only in FIG. 4) in the rear of vehicle 50. With additional reference to FIG. 1 and FIG. 1A, storage body 60 is generally considered to have an upstream end 75 directed toward hopper 61 and a downstream end 76 directed toward rearward end 53 of chassis 51. The indication of upstream end 75 and downstream end 76 is set forth for facilitating ease of discussion of preferred embodiments herein and is not intended to be regarded as an inherently limiting feature of ensuing preferred embodiments to be herein discussed. Regarding FIG. 4, panels 70, 71, 72 and 73 are substantially coextensive and each include a forward edge 70A, 71A, 72A and 73A, side edges 70B and 70C, 71B and 71C, 72B and 72C and 73B and 73C, and a rearward edge 70D, 71D, 72D and 73D. Forward edges 70A, 71A, 72A and 73A of panels 70, 71, 72 and 73 at upstream end 75 of storage body 62 cooperate together to bound an upstream opening 80 into chamber 74, and rearward edges 70D, 71D, 72D and 73D of panels 70, 71, 72 and 73 at downstream end 76 of storage body 62 cooperate together to bound a downstream opening 81 into chamber 74.

For the purposes of orientation regarding FIGS. 1–4, hopper 61 is generally intended to have an upstream end 82 directed toward cab 59 and a downstream end 83 directed toward upstream end 75 of storage. body 62. As seen in FIG. 4, hopper 61 includes a rearward edge 84 at downstream end 83 bounding an opening 85. Forward edges 70A, 71A, 72A and 73A of storage body 62 may be mounted with rearward edge 84 of hopper, such as by conventional welding techniques, in refuse communication for facilitating the transferal of refuse from hopper 61 into chamber 74 from opening 85 of hopper through upstream opening 80 of storage body 62. In this regard, the upstream end 82 and downstream end 83 of hopper 61 and the upstream end 75 and downstream end 76 of storage body 62 are intended to denote the general direction of the passage of refuse into and through body 60 of vehicle 50. In this regard, refuse placed within hopper 61 is intended to pass from hopper 61 and into storage body 62 in a direction from upstream end 82 of hopper 61 to downstream end 76 of storage body 62 in the direction indicated by the arrowed line A in FIG. 4 by virtue of a packer assembly carried by hopper 61, further details of which will be discussed as the detailed description ensues.

With attention directed to FIG. 5, illustrated is a sectional view taken along line 5—5 of FIG. 2 showing panels 70, 71, 72 and 73 of storage body 62 as they would appear assembled. As shown, side edge 70B of top panel 70 is bonded or otherwise coupled with side edge 72C of side panel 72, side edge 72B of side panel 72 is bonded or otherwise coupled with side edge 71B of bottom panel 71, side edge 71C of bottom panel 71 is bonded or otherwise coupled with side edge 73B of side panel 73, and side edge 73C of side panel 73 is bonded or otherwise coupled with side edge 70C of top panel 70 by conventional welding techniques. Furthermore, each panel 70, 71, 72 and 73 includes a substantially arcuate inner surface 70E, 71E, 72E and 73E cooperating together to bound chamber 74. In other than a preferred embodiment, some or all of the corners of storage body 62 may be made simply by bending substantially arcuate pieces.

In accordance with the preferred teachings presented herein, the outwardly arcuate configuration of each panel 70, 71, 72 and 73 is set forth not as a matter of design, but rather to advantageously impart unexpected rigidity and strength to each panel 70, 71, 72 and 73 such that when coupled together to form storage body 62, function together to impart a high degree of strength and corresponding rigidity to the finally assembled storage body 62 without the need for additional reinforcement replete in prior art storage bodies currently in use by conventional refuse collection vehicles of the type herein presented. As a result, and unlike storage body 62, because conventional storage bodies employed with refuse collection vehicles of the variety presented herein employ corrugated panels and panels having vertical and/or horizontal reinforcing elements, they are considerably heavier and bulkier than storage body 62 presented herein and exceedingly difficult and expensive to construct. Because storage body 62 is extremely strong and considerably light as compared to conventional prior art storage bodies of like variety, chamber 74 may accommodate increased payloads within the weight limits for normal highway travel in accordance with state and federal regulations. Panels 70, 71, 72 and 73 may each be further constructed of selected and desired thickness for increasing the wear of the panels 70, 71, 72 and 73 over an extended period of time as desired by the user. Furthermore, because each panel 70, 71, 72 and 73 is an integral piece, minimal welding is required to assemble panels 70, 71, 72 and 73 to form storage body 62 unlike conventional storage bodies. In addition, the finished shape of storage body 62 is considerably aerodynamic thus occasioning less air resistance during travel of vehicle 50 advantageously resulting in less fuel consumption of vehicle 50 during normal refuse collection activities.

Regarding the preferred assembly of panels 70, 71, 72 and 73 of storage body 62, attention is directed to FIGS. 6–10. In this regard, FIG. 6 illustrates an enlarged sectional view of an upper corner of storage body 62 of FIG. 5 at the point where side edge 70C of top panel 70 meets side edge 73C of side panel 73, with side edge 73C of side panel 73 welded to top panel 70 at a point adjacent to and generally underlying side edge 70C of top panel 70. FIG. 7 shows an enlarged sectional view of a lower corner of storage body 62 of FIG. 5 at the point where side edge 73B of side panel 73 meets side edge 71C of lower panel 71, with side edge 71C of lower panel 71 welded to side panel 73 at a point adjacent to and generally overlying side edge 73B of side panel 73. FIG. 10 illustrates an enlarged sectional view of another lower corner of storage body 62 of FIG. 8 (FIG. 8 being substantially similar to the view of FIG. 5) at the point where side edge 71B of lower panel 71 meets side edge 72B of side panel 72, with side edge 71B of lower panel 71 welded to side panel 72 at a point adjacent to and generally overlying side edge 72B of side panel 72. Finally, FIG. 9 illustrates an enlarged sectional view of the other upper corner of storage body 62 of FIG. 8 at the point where side edge 72C of side panel 72 meets side edge 70B of top panel 70, with side edge 72C of side panel 72 welded to top panel 70 at a point adjacent to and generally underlying side edge 70B of top panel 70. Consistent with the foregoing discussion, it will be generally understood that side edges 7013 and 70C of top panel overly side edges 72C and 73C of side panels 72 and 73, respectively, land that side edges 71B and 71C overly side edges 72B and 73B of side panels 72 and 73, respectively. In this manner of assembly, the load bearing force generated against inner surfaces 70E, 71E, 72E and 73E of panels 70, 71, 72 and 73 by refuse contained and compacted within chamber 74 is primarily born not by the weld seams interconnecting the respective side edges of panels 70, 71, 72 and 73 together, but rather at the overlapping junctions of the respective side edges thereby inhibiting the weld seams from breaching or otherwise becoming compromised as the load bearing force generated against the inner surfaces 70E, 71E, 72E and 73E by refuse contained and compacted within chamber 74 increases. As a result, because considerable load bearing force may be exerted against inner surfaces 70E, 71E, 72E and 73E of panels 70, 71, 72 and 73, storage body 62 may accommodate loads of considerable capacity.

Each panel 70, 71, 72 and 73 may be desirably constructed from suitable sheet stock and rolled or formed to the desired arcuate shape in accordance with conventional manufacturing techniques well known to those having regard toward the relevant art. Furthermore, as evidenced in FIG. 5 and FIG. 8, bottom panel 71 of storage body 62 is shown as it would appear mounted and supported by frame 56 of vehicle 50. In accordance with conventional practice, bottom panel 71 may be fixedly engaged with frame 56 by virtue of suitable and conventional fastening mechanisms operative for fixedly and securingly engaging storage body 62 to frame 56.

With attention directed back to FIG. 2, vehicle 50 further includes a gate assembly generally designated by the reference character 90 including a closure element 91 mounted with downstream end 76 of storage body 62 to serve as a closure for downstream end 76 of storage body 62, in accordance with a preferred embodiment of the present invention. Motive or drive assemblies, each being generally designated by the reference character 92, operate to mount closure element 91 to downstream end 76 of storage body and to move closure element 91 between opened and closed positions, details of which will be discussed presently. For the purposes of orientation and reference, closure element 91 is generally intended to have an upper end 91A located adjacent top panel 70 of storage body and a lower end 91B located toward rearward end 53 of chassis 51.

With continuing reference to FIG. 2 and additional reference to FIG. 4 showing closure element 91 in an exploded perspective view, closure element 91 is comprised of a generally cup-shaped body 93. Body 93, preferably constructed of steel or other material having similar structural and functional characteristics, includes an upper panel 94, a lower panel 95, side panels 96 and 97 and an end panel 98 cooperating together to define body 93. Like storage body 62, panels 94, 95, 96, 97 and 98 are outwardly arcuate and include edges that may be coupled together in a manner substantially similar to panels 70, 71, 72 and 73 of storage body 62 as previously discussed, further details of which will not be herein specifically described. For the purpose of orientation, body 93 is generally intended to have an inner end 100 and an outer end 101, with panels 94, 95, 96 and 97 including inner edges 94A, 95A, 96A and 97A (shown only in FIG. 4) cooperating together to define inner end 100.

The various panels 94, 95, 96, 97 and 98 of body 93 may be suitable formed from sheet material in accordance with conventional manufacturing techniques. In this regard, attention is directed to FIGS. 11–13 to generally illustrate this technique. Regarding FIG. 11, illustrated is a perspective view of panel 94 and panel 96 shown as they would appear being cut or otherwise formed from an integral piece of sheet material generally designated by the reference character 105. Although not herein specifically illustrated, those of ordinary skill will readily understand that sheet material 105 may be desirably cut to form panels 94 and 96 by virtue of conventional cutting techniques. Once cut from sheet material 105, panels 94 and 96 may be formed to an arcuate configuration by virtue of suitable and conventional techniques. In this regard, FIG. 12 illustrates panel 94 as it would appear passing through a roller assembly generally designated by the reference character 106 operative for imparting an arcuate shape to panel 94 as illustrated in FIG. 13 showing a vertical longitudinal sectional view of panel 94 as it would appear after passing through roller assembly 106. Consistent with the present discussion, the remaining panels 95, 97 and 98 may be constructed in much the same manner and subsequently assembled to form closure element 91. For the purposes of illustration, FIG. 14 illustrates panels 94, 96, 97 and end panel 98 of body 93 as they would appear during assembly.

Because panels 70, 71, 72 and 73 of storage body 62 and panels 94, 95, 96, 97 and 98 of closure element 91 are integral pieces, they each may be desirably constructed from a single piece of sheet material. In the interests of eliminating waste, the sheet material may otherwise be desirable sized to the dimension of not only a single selected panel, but also provided of a size sufficient to allow a user to cut the sheet material for advantageously forming two or more panels of either storage body 62 and/or closure element 91.

Consistent with the preferred teachings of the instant invention, closure element 91 is movable between a normal closed position as shown in FIGS. 1–3 and an open position as shown in FIG. 17. In this regard, in the normal closed position of closure element 91, the inner edges 94A, 95A, 96A and 97A defining inner end 100 of closure element 91 mate with and engage rearward edges 70D, 71D, 72D and 73D of panels 70, 71, 72 and 73 of storage body 62 to enclose downstream opening 81. It is generally intended that during refuse collection operations, closure element 91 will be in the normal closed position for allowing refuse to be desirably transferred and stored from hopper 61 into chamber 74 of storage body 62. After collection is complete, the refuse may then be transferred to a suitable refuse disposal facility at which time closure element 91 may be moved from the normal closed position to the open position for allowing the refuse contained within chamber 74 of storage body 62 to be ejected from downstream opening 81 thereof, further details of which will be discussed as the detailed description ensues.

Although not essential to the present invention, casing elements 108 (FIG. 4) may be provided and mounted, such as by welding, adjacent and along rearward edges 70D, 71D, 72D and 73 of panels 70, 71, 72 and 73 and inner edges 94A, 95A, 96A and 97A of closure element 91 for the purposes of enhancing the aesthetic appeal of vehicle 50 and strengthening closure element 91 where it mates with storage body 62.

As previously intimated in accordance with FIG. 1, closure element 91 is mounted with downstream end 76 of storage body 62 by virtue of motive or drive assemblies 92, each being operative and cooperating together to move closure element 91 between the normal closed position and the open position. Each drive assembly 92 is the mirror image of the other. As shown in FIG. 1, drive assemblies 92 are mounted with storage body 62 at an elevated location proximate top panel 70 along the upper corners of storage body 62 in spaced-apart and substantially parallel relation. As it will be illustrated from the ensuing discussion, the preferred placement of each drive assembly 92 in the foregoing manner provides for the even distribution of the weight of closure element 91 by each drive assembly 92 for facilitating not only a secure and proper mount of closure element 91 to storage body 62, but also the efficient movement of closure element 91 by drive assemblies 92 alternately between the normal closed and open positions. Furthermore, although two drive assemblies 92 are illustrated in combination with a preferred embodiment of the present invention, it will be generally understood that one or more than two drive assemblies 92 may be used in combination with gate assembly 90 without departing from the nature and scope of the present invention as herein specifically described. In this regard, if a user were to choose to use one drive assembly 92, it may be desirably mounted at a location central of top panel 70 of storage body proximate the downstream end thereof.

Figure 15:
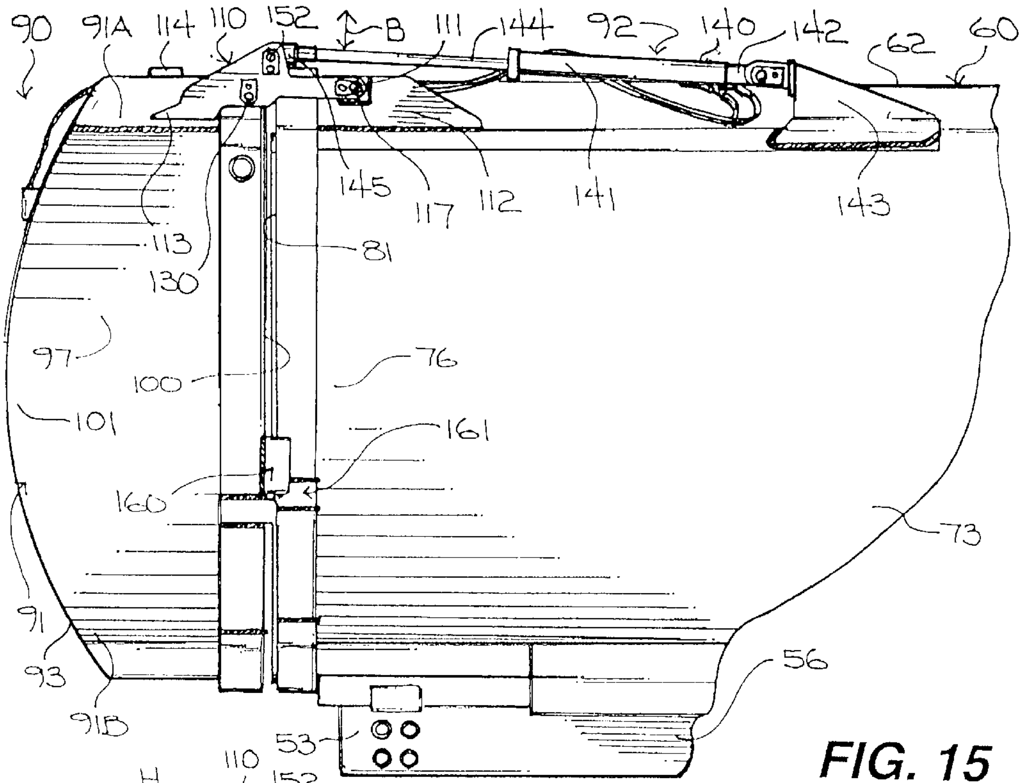
FIG. 15 illustrates a fragmented side elevational view of the storage body and the gate assembly of FIG. 1 with the closure element shown as it would appear in a closed position, the gate assembly further including a drive assembly for moving the closure element between closed and opened positions, the drive assembly including a hydraulic drive assembly mounted with a linkage element interconnecting the closure element with the storage body, in accordance with a preferred embodiment of the present invention.

Because each drive assembly 92 is the mirror image of the other, only one will be herein presented for ease and efficiency of discussion. In this regard, attention is directed to FIG. 15 illustrating a curbside elevational view of storage body 62 and gate assembly 90 of vehicle 50. Regarding a preferred embodiment thereof, drive assembly 92 is comprised of a linkage element 110 mounted for pivotal movement generally at downstream end 76 of storage body 62. With additional reference to FIG. 18 illustrating an enlarged view of linkage element 110, linkage element 110 is generally intended to include a proximal end 111 mounted for pivotal movement to an upstanding support flange 112 fixed to and extending upwardly from storage body 62 adjacent downstream end 76. Linkage element 110 extends rearwardly from proximal end 111 and is generally intended tQ terminate with a distal end 113 at a point outboard of downstream opening 81 of storage body 62, inboard of inner end 100 of closure element 91, somewhat subjacent proximal end 111 and subjacent and diametrically opposed to a stop 114 fixed to and extending laterally outwardly from upper end 91A of closure element 91. As herein specifically discussed, stop 114 is generally intended to be included within the nature and scope of drive assembly 92. Closure element 91 is mounted with and carried by linkage element 110 for pivotal movement at a point intermediate proximal end 111 and distal end 113.

Figure 25:
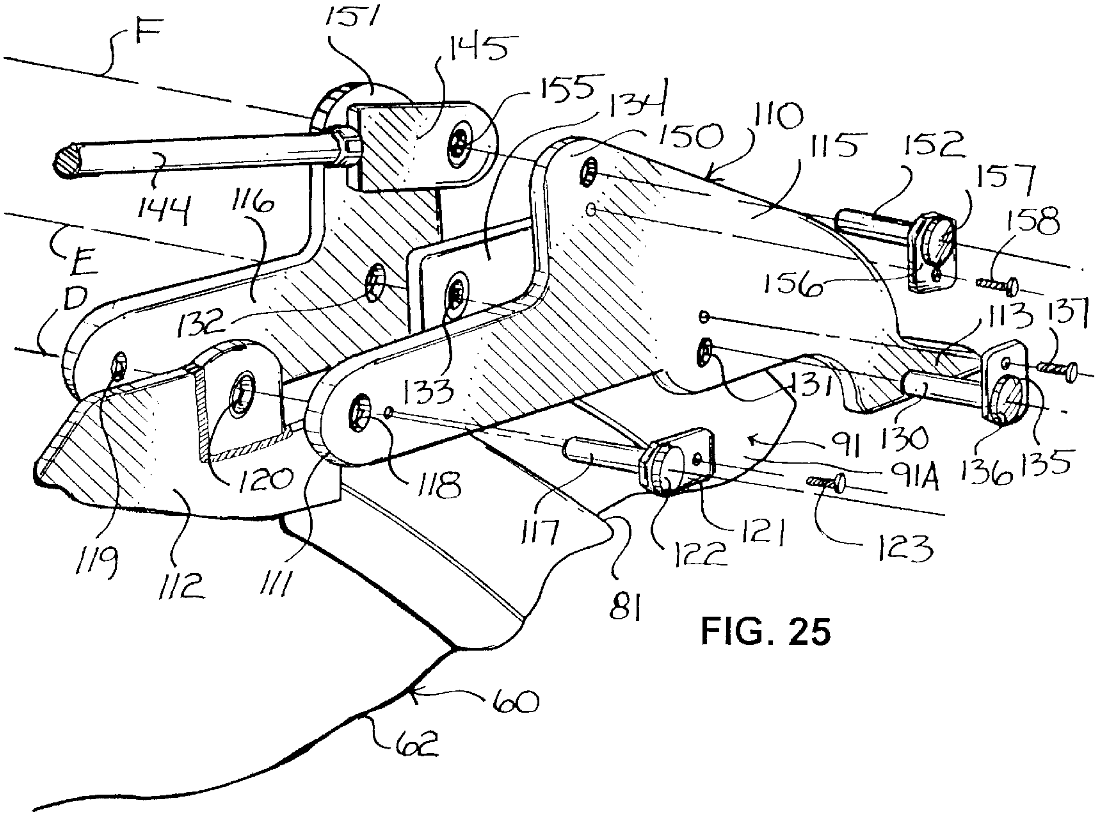
FIG. 25 illustrates an exploded perspective view of the linkage element of the drive assembly illustrated in FIG. 15, in accordance with a preferred embodiment of the present invention.

With momentary reference directed to FIG. 25, illustrated is an exploded perspective view of linkage element 110 setting forth the various and specific structural details thereof which will now be discussed. As shown in FIG. 25, linkage element 110, which is preferably constructed of steel or other like material having similar structural and functional characteristics, is generally comprised of a pair of substantially coextensive support members 115 and 116 being the mirror image of one another. In this regard, support members 115 and 116 are interconnected in opposing and substantially coextensive relation at proximal end 111 for coextensive pivotal movement by a pivot pin 117 (also shown in FIG. 15) extending through apertures 118 and 119 carried by support members 115 and 116, respectively, and an aperture 120 carried by flange 112 sandwiched intermediate support members 115 and 116. Regarding the specific example shown in FIG. 25, pivot pin 117 includes a plate 121 fixedly and rigidly carried by a headed end 122 thereof which may be fixedly and rigidly secured to support member 115 by virtue of a fastener 123 of which may be a conventional threaded fastener, a rivet or other suitable mechanical fastener.

Support members 115 and 116 are mounted for supporting pivotal movement to upper end 91A of closure element 91 at a point intermediate proximal end 111 and distal end 113 thereof by virtue of a pivot pin 130 (also shown in FIG. 15) extending through apertures 131 and 132 carried by support members 115 and 116, respectively, and an aperture 133 carried by an upstanding flange 134 sandwiched between support members 115 and 116 and extending outwardly from closure element 91 at a point rearward of and substantially confronting flange 112. For the purposes of orientation and reference to be made presently, the point of attachment and support of closure element 91 with linkage element 110 is generally intended, in this specific example, to be regarded as a medial point of linkage element 110 as defined by pivot pin 130. Like pivot pin 117, pivot pin 130 includes a plate 135 fixedly and rigidly carried by a headed end 136 thereof which may be fixedly and rigidly secured to support member 115 by virtue of a fastener 137 of which may be a conventional threaded fastener, a rivet or other suitable mechanical fastener.

With attention directly momentarily back to FIG. 15, and as previously intimated, linkage element 110 is mounted for reciprocal pivotal movement about proximal end 111 in the direction indicated by the double arrowed line B. As will be discussed shortly, the general structural orientation of linkage element 110, among other things, facilitates movement of closure element 91 between the normal closed and opened positions upon movement of linkage element 110 alternately in general ascending and descending pivotal traverse about proximal end 111 in the directions indicated by arrowed line B. To this end, FIG. 15 sets forth a suitable actuating mechanism for actuating linkage element 110 alternately along ascending and descending pivotal traverse.

In particular, FIG. 15 illustrates a conventional and well known hydraulic cylinder assembly 140 including a cylinder 141 having an inner end 142 mounted with storage body 62 inboard of or otherwise forwardly and spaced from downstream opening 81 and linkage element 110. In a further and more specific aspect, inner end 142 of cylinder 141 is mounted for pivotal movement to an upstanding flange 143 fixed to and extending upwardly from storage body 62 at a point forwardly of and spaced from flange 112. Hydraulic cylinder assembly 140 further includes an operating rod 144 mounted partially within cylinder 141 for reciprocal movement therein and terminating with an outer end 145 mounted with linkage element 110 for pivotal movement. In this regard, and with momentary reference directed back to FIG. 25, support members 115 and 116 define ascending medial aspects 150 and 151, respectively, each terminating at a point generally superjacent to and intermediate proximal end 111 and the medial point as defined by pivot pin 130 at which closure element 91 is carried by linkage element 110. Outer end 145 of operating rod 144 is interconnected for pivotal movement to medial aspects 150 and 151 of support members 115 and 116 by virtue of a pivot pin 152 (also shown in FIG. 15) extending through apertures 153 and 154 (not shown in FIG. 25) carried by medial aspects 150 and 151, respectively, and an aperture 155 carried by outer end 145 of operating rod 144 sandwiched between medial aspects 150 and 151 of support members 115 and 116, respectively. Regarding the specific example shown in FIG. 25, and like pivot pins 117 and 130 previously discussed, pivot pin 152 includes a plate 156 fixedly and rigidly carried by a headed end 157 thereof which may be fixedly and rigidly secured to support member 115 by virtue of a fastener 158 which may be a conventional threaded fastener, a rivet or other suitable mechanical fastener.

Regarding a preferred embodiment illustrated in FIG. 25, and for the purposes of orientation, proximal end.111 of linkage element pivots about an axis D at pivot pin 117, closure element pivots relative linkage element 110 about an axis E at pivot pin 130 spaced rearwardly and somewhat subjacent axis D and outer end 145 of operating rod 144 of hydraulic cylinder assembly 140 pivots relative linkage element 110 about an axis F at pivot pin 152 generally intermediate and superjacent axis D and axis E, axes D, E and F further residing in and defining substantially parallel axes or planes. Consistent with the preferred teachings of the present invention, the relative orientations of axes D, E and F are set forth for the purposes of example regarding a preferred embodiment, and are not intended to be either essential or inherently limiting features in light of the nature and scope of the instant invention as herein specifically described.

Figure 22:
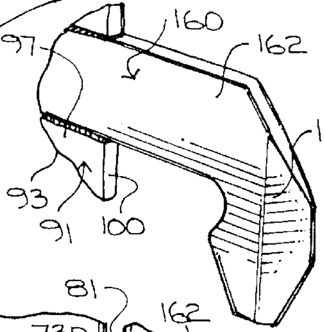
FIG. 22 illustrates a fragmented perspective view of an engagement assembly extending outwardly from the closure element, in accordance with a preferred embodiment of the present invention.
Figure 23:
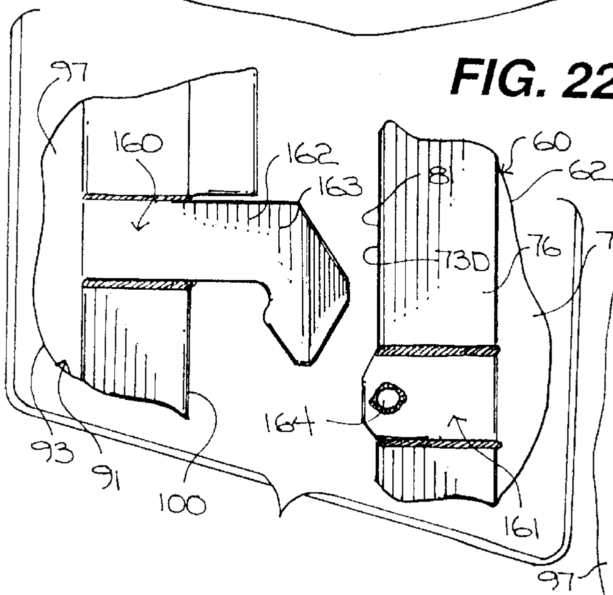
FIG. 23 illustrates a side elevational view of the engagement assembly of FIG. 22 shown as it would appear adjacent a complemental engagement assembly carried by the storage body, in accordance with a preferred embodiment of the present invention.
Figure 24:
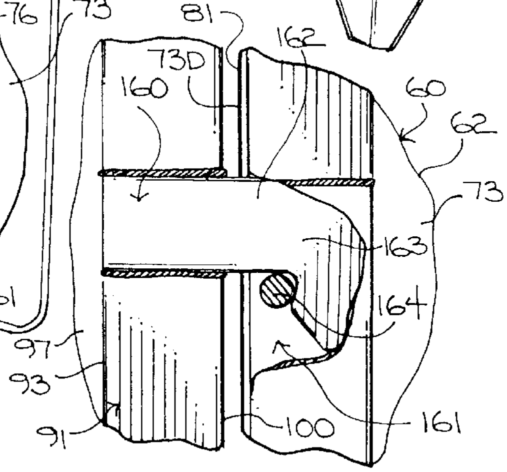
FIG. 24 illustrates a cut away view somewhat similar to the view of FIG. 23 with the engagement assembly shown as it would appear engaged with the complemental engagement assembly, in accordance with a preferred embodiment of the present invention.

Having described the various structural details of drive assembly 92, prior discussions intimate that inner end 100 of closure element 91 operates to mate with rearward edges 70D, 71D, 72D and 73D of storage body 62 to enclose downstream opening 81 of storage body 61 in the normal closed position of closure element 91 as generally illustrated in FIGS. 1–3 and 15. With closure element 91 supported by linkage element 110 of drive assembly 92 proximate upper end 91A thereof at pivot pin 130, an engagement means is provided to maintain closure element 91 in the normal closed position. To this end, and to desirably maintain closure element 91 in the normal closed position in accordance with a preferred embodiment of the present invention, provided is an engagement assembly 160 carried by closure element 91 proximate inner end 100 operative to detachably and securingly engage a complemental engagement assembly 161 carried by storage body 62 proximate downstream opening 81. Regarding a preferred embodiment thereof as shown in FIG. 17, FIG. 22 and FIG. 23, engagement assembly 160 is generally comprised of a pair of hook elements 162 (only one shown) carried by and extending outwardly from either lateral side of closure element from each respective side panel 96 (hook element 162 not shown with respect to side panel 96) and 97 and terminating with a hooked distal end 163 at a point outboard of inner end 100, hooked distal end 163 further being directed downwardly toward frame 56 of chassis 51 in the closed position of closure element 91. Regarding FIGS. 23 and 24, complemental engagement assembly 161 is generally comprised of a pair of corresponding pins 164 (only one shown) carried by and extending outwardly from either lateral side of storage body 62 proximate downstream opening 81 thereof from each respective side panel 72 (pin 164 not shown with respect to side panel 72) and 73 somewhat inboard of downstream opening 81.

Figure 16:
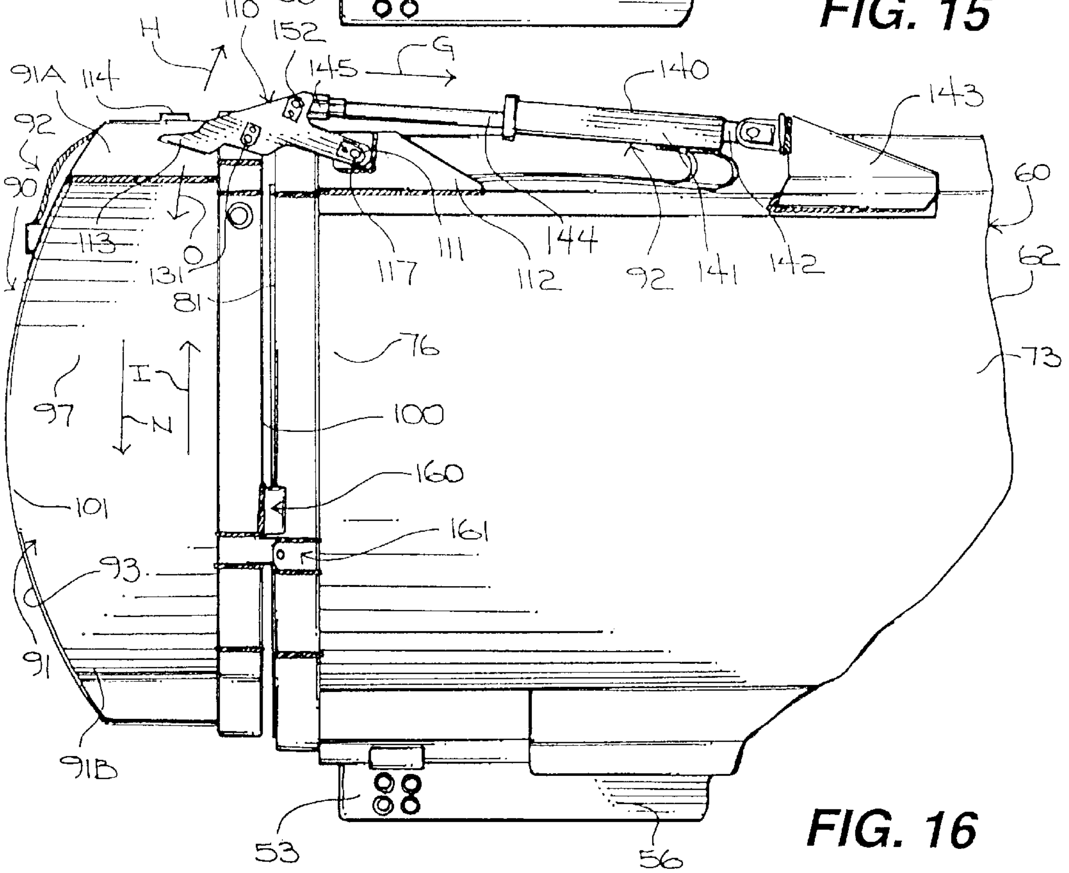
FIG. 16 illustrates a view very similar to the view of FIG. 15, in accordance with a preferred embodiment of the present invention.

Consistent with the foregoing discussion, each hooked distal end 163 of each hook element 162 is operative for normally, hookingly and securingly receiving or otherwise engaging a respective pin 164 (FIG. 24) in the normal closed position of closure element 91 in order to secure inner end 100 of closure element 91 to rearward edges 70A, 71A, 72A and 73A of storage body 62 to enclose downstream opening 81 of storage body 62. From the normal closed position of closure element 91 as illustrated in FIG. 15, hydraulic cylinder assembly 140 of each drive assembly 92 may be actuated to retract operating rod 144 into cylinder 141 in the direction indicated by the arrowed line G in FIG. 16 to pull outer end 145 of operating rod 144 against pivot pin 152 pulling linkage element 110 at the medial point to correspondingly impart pivotal movement to linkage element 110 at proximal end 111 about pivot pin 117 in ascending pivotal traverse in the direction indicated by the arrowed line H in FIG. 16. In this manner of actuation of hydraulic cylinder assembly in a retracted orientation, linkage element 110 will pull closure element 91 at the medial point as defined by pivot pin 130 in general ascending traverse in the direction of arrowed line I in FIG. 16 to correspondingly disengage the hooked distal end 163 of each hook element 162 from a corresponding pin 164.

Figure 20:
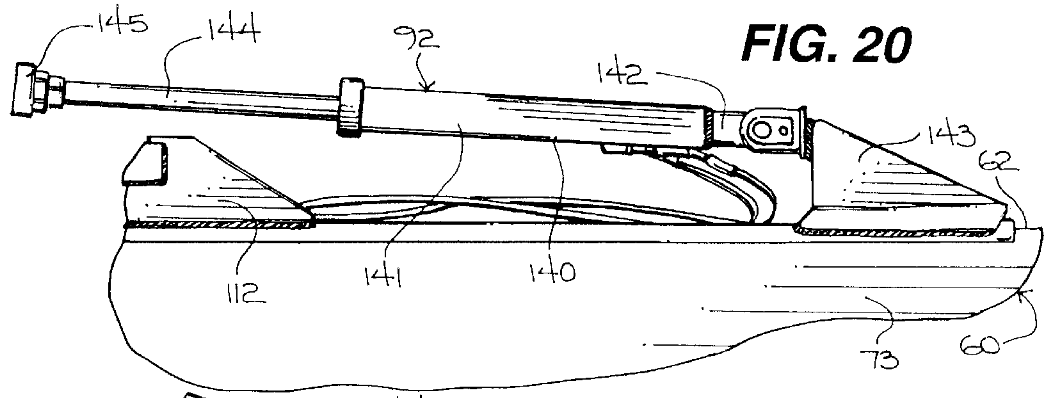
FIG. 20 illustrates a side elevational view of the hydraulic cylinder assembly of the gate assembly as illustrated in FIG. 15, in accordance with a preferred embodiment of the present invention.
Figure 21:
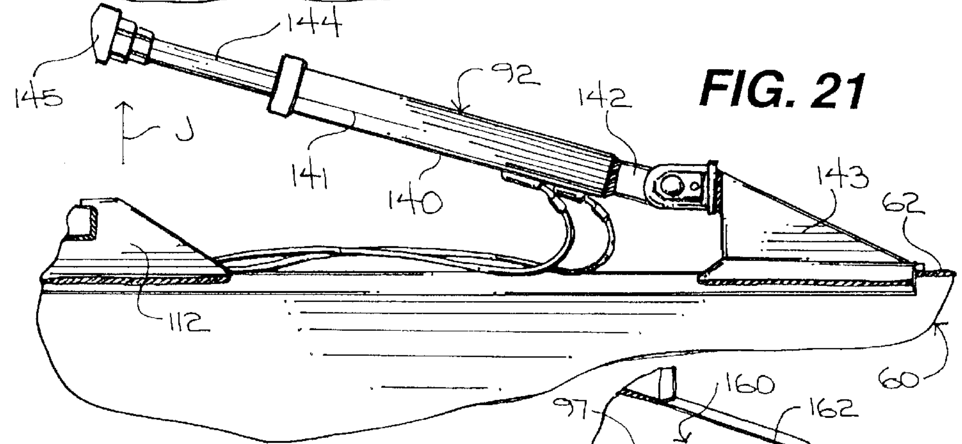
FIG. 21 illustrates a view very similar to the view of FIG. 21, in accordance with a preferred embodiment of the present invention.

With momentary reference to FIG. 20, and for the purposes of orientation, reference and clarity, operating rod 144 of hydraulic cylinder assembly 140 is shown as it would appear fully extended in a substantially horizontal orientation with closure element 91 (not shown) positioned in the closed position. Upon actuation of hydraulic cylinder assembly 140 to retract operating rod 144 into cylinder 141, hydraulic cylinder assembly 140 will correspondingly pivot about inner end 142 along ascending pivotal traverse in the direction indicated by the arrowed line J in FIG. 21 to correspond to the open position of closure element 91 to be discussed presently.

As linkage element 110 moves along ascending pivotal traverse as operating rod 144 is retracted into cylinder 141 from the normal closed position of closure element 91, linkage element 110 will pivot relative closure element 91 about pivot pin 130 and distal end 113 of linkage element 110 will approach and subsequently engage stop 114 as evidenced in FIG. 19. Upon engagement of distal end 113 with stop 114, pivotal movement of closure element 91 about pivot pin 130 will cease to result in the vertical transverse of closure element 91 with linkage element 110. From this orientation of closure element 91 relative linkage element 110 as shown in FIG. 19, the continued retraction of operating rod 144 into cylinder 141 in the direction indicated by the arrowed line G in FIG. 16 will cause closure element 91 to pivot outwardly along ascending pivotal traverse about pivot pin 117 in the direction indicated by the arrowed line K in FIG. 17 to disengage inner end 100 of closure element 91 from downstream opening 81 of storage body 62 and subsequently orient closure element 91 in the open position in the retracted orientation of operating rod 144 of hydraulic cylinder assembly 140 to correspondingly open and allow access to downstream opening 81 of storage body 62.

From the open position of closure element 91 as illustrated in FIG. 17, hydraulic cylinder assembly 140 may be actuated for extending operating rod 144 outwardly from cylinder 141 in the direction indicated by the arrowed line L to cause closure element 91 to pivot inwardly along descending pivotal traverse about pivot pin 117 in the direction indicated by the arrowed line M to engage inner end 100 of closure element 91 with downstream opening 81 of storage body 62. With the continued extension of operating rod 144 in the direction indicated by the arrowed line L, distal end 113 will subsequently disengage stop 114 to cause closure element 91 to pivot about pivot pin 130 and move in general descending traverse in the direction indicated by the arrowed line N in FIG. 16 as linkage element 110 continues to pivot along descending pivotal traverse about pivot pin 117 as indicated by the arrowed line O in FIG. 16. As operating rod 144 continues to extend pivoting linkage element 110 along descending pivotal traverse in the direction indicated by the arrowed line O, closure element 91 will continue to move along descending traverse indicated by arrowed line N causing each hooked distal end 163 of each hook element 162 to engage a corresponding pin 164 to detachably and securingly engage inner end 100 of closure element 91 with downstream opening 81 of storage body 62 in the normal closed position of closure element 91 corresponding to the extended orientation of operating rod 144 of hydraulic cylinder assembly 140.

From the foregoing discussion, it will be generally understood that engagement assembly 160 is engagable to and detachable from complemental engagement assembly 161 in response solely to the actuation of drive assembly 92. Engagement assembly 160 and complemental engagement assembly 161 contain no moving parts or parts requiring actuation to facilitate engagement and disengagement. In this regard, because engagement assembly 160 and complemental engagement assembly 161 are engagable to and detachable from one another solely in response to actuation of drive assembly 92 in the exemplary manner previously described, engagement assembly 160 and complemental engagement assembly constitute a passive engagement mechanism requiring no additional actuator mechanisms or manual latches.

Those having regard toward the relevant art will appreciate that gate assembly 90 sets forth an exemplary mechanism for facilitating the closing and opening of downstream opening 81 of storage body 62 in a vehicle 50 generally of the type operative for collecting refuse. Although not herein specifically set forth, conventional controls for operating hydraulic drive assembly 140 for each drive assembly 92 may be suitably located within cab 59 for allowing the operator to actuate gate assembly 90 alternately between the normal closed and opened positions of closure element 91 as desired. Also, although hydraulic drive assembly 140 has been disclosed as a preferred means of imparting alternating pivotal movement to linkage element 110 in the manner previously described, other suitable means for actuating linkage element 110 along alternating pivotal traverse may be employed consistent with the teachings herein without departing from the nature and scope of the present invention as herein specifically described. Furthermore, in the event one or more of the hydraulic cylinder assemblies 140 were to fail with closure element 91 in the open position, closure element 91 would merely fall from the open position to the closed position as herein described without incident.

As previously intimated in combination with FIG. 1, refuse placed or otherwise deposited within hopper 61 by container-handling apparatus 63 (FIG. 1A) is intended to pass from hopper 61 and into storage body 62 in a direction from upstream end 82 of hopper 61 to downstream end 76 of storage body 62 in the general direction indicated by the arrowed line A in FIG. 4 by virtue of a packer assembly carried by hopper 61 and generally designated by the reference character 170, which will now be presently discussed in combination with FIGS. 26–36 in accordance with a preferred embodiment of the present invention. For the purposes of discussion, packer assembly 170 will be set forth for urging refuse into storage body 62 through upstream opening 75. However, this is not intended to be limiting as packer assembly 170 may be used for urging refuse into storage body 62 from downstream opening 76 in some applications. For the purposes of orientation and reference with the ensuing discussion, and with momentary reference back to FIG. 1, hopper 61 is disposed in refuse communication with upstream opening 80 (not shown in FIG. 1) of storage body 62 and includes spaced apart upstanding sidewalls 171 and 172 extending forwardly from upstream end 75 of storage body 62 terminating with an endwall 173 located at upstream end 82 of hopper 61 just rearward of cab 59, sidewalls 171 and 172 and endwall 173 cooperating together to define hopper 61.

Figure 26:
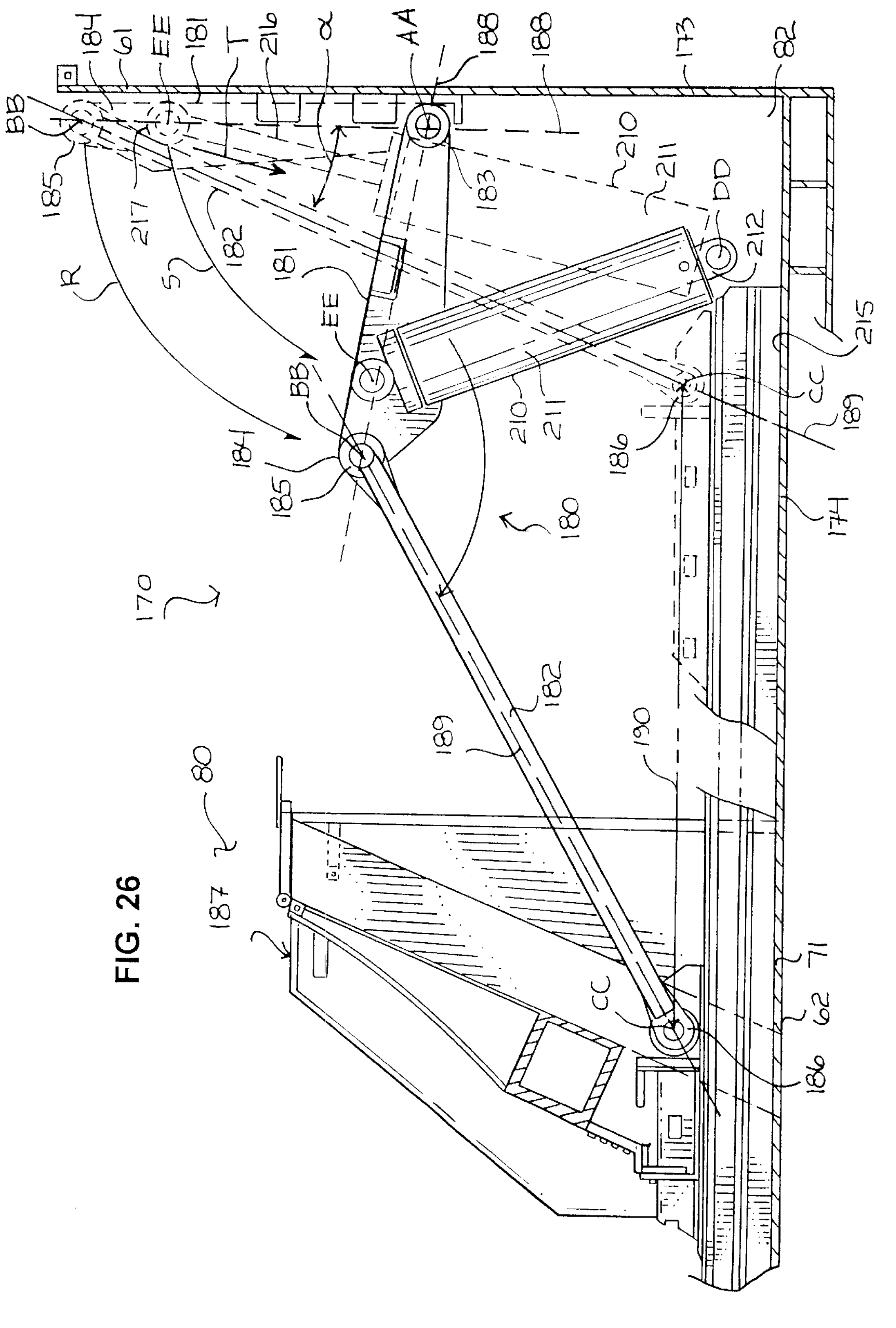
FIG. 26 illustrates a side elevational view of a packer assembly carried by the hopper of the vehicle of FIG. 1, the packer assembly including a linkage assembly operative for actuating a platen carried by a carriage assembly for facilitating the transfer of refuse from the hopper to the storage body, in accordance with a preferred embodiment of the present invention.

Regarding FIG. 26, illustrated is a vertical curb side sectional view of hopper 61 and a portion of bottom panel 71 of storage body 62 further including a curb side elevational view of packer assembly 170. As evidenced in FIG. 26, hopper 61 includes a floor or bottom panel 174 which is an extension of bottom panel 71 of storage body 62, floor 174 having a substantially arcuate shape like bottom panel 71 and extending forwardly from storage body 62 terminating with endwall 173. Packer assembly 170 is generally comprised of a linkage assembly generally designated at 180 including a first linkage element 181 and a second linkage element 182. First linkage element 181 is generally intended to include a proximal end 183 mounted with hopper 61 at a location proximate upstream end 82 at an elevated position relative floor 174 for pivotal movement about axis AA extending transversely relative endwall 173 and generally horizontally relative to, or otherwise substantially parallel with, floor 174. First linkage element 181 extends outwardly from proximal end 183 and is generally intended to terminate with a distal end 184 mounted with an inner end 185 of second linkage element 182 for pivotal movement about axis BB being substantially parallel to axis AA. Second linkage element 182 trends or otherwise extends rearwardly from distal end 184 of first linkage element 181 and terminates with an outer end 186 mounted with a platen 187 subjacent proximal end 183 of first linkage element 181 for pivotal movement about axis CC being substantially parallel to axis AA and axis BB, platen 187 being mounted with hopper 61 and storage body along a fixed path to serve as a means for facilitating the passage of platen 187 from hopper 61 into and through storage body 62 and the consequent transfer of refuse from hopper 61 into chamber 74 through upstream opening 80 of storage body 62 in response to the operation of linkage assembly 180, further details of which will be discussed as the detailed description ensues. For the purposes of orientation regarding a preferred embodiment thereof, first linkage element 181 includes a length defined along an axis 188 thereof generally defined from axis AA to axis BB, second linkage element 182 includes a length defined along an axis 189 thereof generally defined from axis BB to axis CC, and first linkage element 181 and second linkage element 182 cooperate generally to define an angle at a junction defined at axis BB at which axis 188 and axis 189 intersect.

With continuing reference to FIG. 26, linkage assembly 180 articulates and is movable alternately between a retracted orientation and an extended orientation operative for moving platen 187 alternately between a retracted position located adjacent upstream end 82 of hopper 61 and an extended position located adjacent upstream opening 80 of storage body 62 for facilitating the transfer of refuse contained within hopper 61 rearwardly of platen 187 into chamber 74 of storage body 62 through the upstream opening 80 thereof. For the purposes of the ensuing discussion, it will be assumed that outer end 186 of second linkage element 182 is fixed to platen 187 for pivotal movement and that platen 187 is mounted along the fixed path as previously intimated extending from a location adjacent upstream end 82 of hopper 61 to adjacent upstream opening 80 of storage body 62.

In the retracted position of linkage assembly 180 as indicated by the dotted outline of linkage assembly 180 shown in FIG. 26, first linkage element 181 resides in a substantially upright or vertical orientation substantially parallel with endwall 173 of hopper 61 with second linkage element 182 also residing in a substantially vertical orientation with outer end 186 thereof trending somewhat rearward of inner end 185, axis 188 of first linkage element 181 and axis 189 of second linkage element 182 defining a substantially acute angle about axis BB as indicated by the reference symbol α. From the retracted orientation, linkage assembly 180 may be moved along a rearward stroke (relative to body 60) to an extended orientation, with first linkage element 181 to pivot at proximal end 183 thereof about axis AA with distal end 184 and axis BB to correspondingly move rearwardly into hopper 61 toward upstream opening 80 of storage body along a substantially circular or arcuate path as indicated by the arrowed line R, with first linkage element 181 to eventually rest in a substantially horizontal orientation. As first linkage element 181 pivots from the retracted or substantially vertical position to the extended or substantially horizontal position as described, second linkage element will correspondingly pivot at inner end 185 thereof about axis BB to urge outer end 186 from the location adjacent upstream end 82 of hopper along substantially horizontal path prescribed by the fixed path of platen 187 to adjacent upstream opening 80 of storage body 62, with second linkage element 182 to eventually rest in a substantially horizontal orientation with outer end 186 of second linkage element 182 to correspondingly, pivot relative platen 187 about axis CC as outer end 186 moves along the substantially horizontal path prescribed by platen 187. From the retracted to the extended orientation of linkage assembly 180 as herein described, platen 187, mounted with outer end 186 of second linkage element 182, will correspondingly move from a retracted position adjacent upstream end 82 of hopper 61 coincident with the location of outer end 186 of second linkage element 182 in the retracted orientation of linkage assembly 180 to an extended position adjacent upstream opening 80 of storage body 62 coincident with the location of outer end 186 of second linkage element 182 in the extended orientation of linkage assembly 180. The movement of platen 187 by linkage assembly 180 will operate to bear platen 187 against refuse carried within hopper rearward of platen 187 to facilitate the transfer of refuse from hopper 61 to chamber 74 of storage body 62 along the fixed path into and through upstream opening 80 of storage body 62.

From the extended orientation of linkage assembly 180, the foregoing operation for moving linkage assembly along the rearward stroke may be reversed for moving linkage assembly along a return or forward stroke for correspondingly moving platen 187 from the extended position coincident with the extended orientation of linkage assembly 180 back to the retracted position coincident with the retracted orientation of linkage assembly 180. In this manner of operation, linkage assembly 180 may be moved alternately along the rearward stroke and the forward stroke for allowing the repeated transferal of refuse from hopper 61 to storage body 62 during normal refuse collection operations. Furthermore, the distance outer end 186 traverses between the retracted position thereof and the extended position thereof defines a substantially horizontal stroke path generally indicated by the reference character 190 in FIG. 26.

Figure 27:
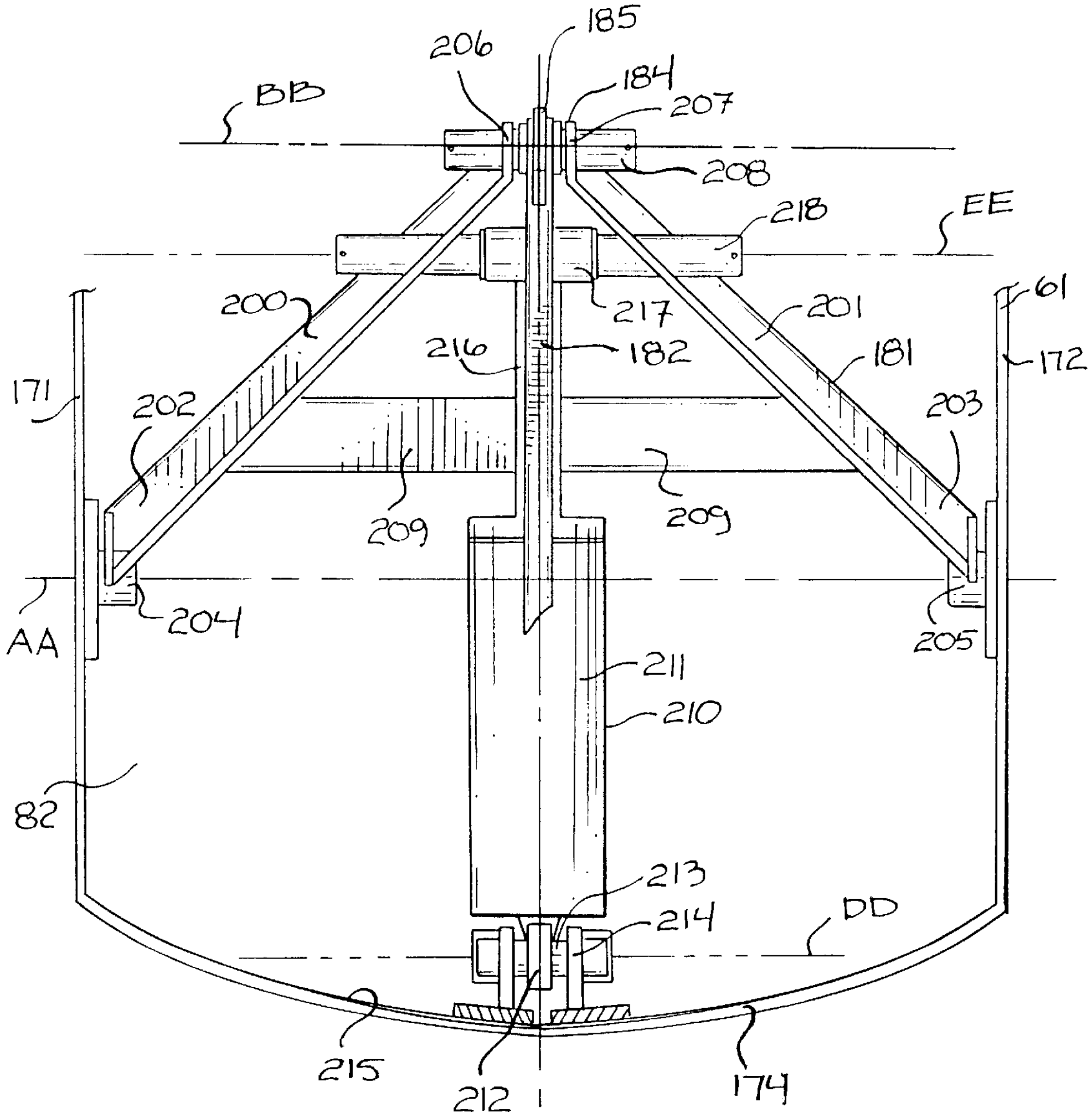
FIG. 27 illustrates a rear elevational view of the packer assembly of FIG. 26, in accordance with a preferred embodiment of the present invention.

To further describe first linkage element 181 in accordance with a preferred embodiment thereof, attention is directed to FIG. 27 illustrating a rear elevational view of linkage assembly 180 shown as it would appear in the retracted orientation. As evidenced in FIG. 27, first linkage element 181 is generally comprised of a pair of elongate arms 200 and 201 each having an inner end 202 and 203 mounted with a respective sidewall 171 and 172 of hopper 61 at an elevated location relative floor 174 and proximate upstream end 82 of hopper 61. Inner ends 202 and 203 generally define proximal end 183 of first linkage element 181 as previously discussed. Each inner end 202 and 203 is correspondingly mounted for pivotal movement about axis AA by virtue of conventional pivotal mounts 204 and 205, respectively. Arms 200 and 201 extend inwardly into hopper 61 from inner ends 202 and 203 in converging relation and terminate with outer ends 206 and 207 generally defining distal end 184 of first linkage element 181. Inner end 185 of second linkage element 182 is mounted intermediate outer ends 206 and 207 for pivotal movement to a dowel 208 carried by outer ends 206 and 207 defining axis BB. A substantially rigid transverse support element 209 interconnects arms 200 and 201 at a location generally intermediate inner ends 202 and 203 and outer ends 206 and 207 for imparting added strength to first linkage element 181, although this is not an essential feature.

With attention directed back to FIG. 26, to facilitate the desired actuation or movement of linkage assembly 180 alternately between the retracted and extended orientations, provided is a conventional hydraulic cylinder assembly 210. Hydraulic cylinder assembly 210 includes a cylinder 211 having a lower end 212 mounted with hopper 61 at a location somewhat rearwardly and subjacent to axis AA and proximal end 183 of first linkage element 181, forwardly of outer end 186 of second linkage element 182 in the retracted orientation thereof and somewhat elevated from floor 174 for pivotal movement about an axis DD being substantially parallel with axes AA, BB and CC. With momentary reference to FIG. 27, lower end 212 of cylinder 211 of hydraulic cylinder assembly 210 may be pivotally mounted with hopper 61 in the foregoing manner by virtue of a dowel 213 mounted with lower end 212 and correspondingly mounted with and carried by a bifurcated bracket 214 fixed to inner surface 215 of floor 174 facing inwardly into hopper 61, although other mechanisms suitable for mounting lower end 212 of cylinder 211 with hopper 61 may be employed consistent with the teachings herein.

Hydraulic cylinder assembly 210 further includes an operating rod 216 mounted partially within cylinder 211 for reciprocal movement therein and terminating with an upper end 217 mounted with first linkage element 181 at a location intermediate proximal end 183 and distal end 184 thereof for pivotal movement about an axis EE being substantially perpendicular to axes AA, BB, CC and DD, with axis EE residing intermediate axis AA and axis BB. As evidenced in FIG. 26, upper end 217 of operating rod 216 is preferably mounted with first linkage element 181 at a location closer to distal end 184 rather than proximal end 183, although this is not an essential feature of the present invention. In this regard, upper end 217 of operating rod 216 may be mounted at any suitable location intermediate proximal end 183 and distal end 184, or perhaps mounted at distal end 184 if desired, without departing from the nature and scope of the present invention as herein specifically described. Regarding FIG. 27, upper end 217 of operating rod 216 may be pivotally mounted with first linkage element 181 in the foregoing manner by virtue of a dowel 218 carried at upper end 217 of operating rod 216 and extending through arms 200 and 201, dowel 218 defining axis EE, although other mechanisms suitable for mounting upper end 217 of operating rod 216 to first linkage element 181 may be employed consistent with the teachings herein. Furthermore, although upper end 217 of operating rod 216 has been disclosed as pivotally mounted with both arms 200 and 201, this is not an essential feature and upper end 217 may otherwise be mounted either to arm 200 or arm 201 if desired.

In operation, hydraulic cylinder assembly 210 may be actuated between an extended orientation and a retracted orientation for moving linkage assembly 180 between the retracted and extended orientations, respectively, along the forward and rearward stokes as defined by stoke path 190 previously described. In this regard, the extended orientation of hydraulic cylinder assembly 210 corresponds to the retracted orientation of linkage assembly 180 as indicated by the dotted outline of hydraulic cylinder assembly 210 and linkage assembly 180 in FIG. 26, and the retracted orientation of hydraulic cylinder assembly 210 corresponds to the extended orientation of linkage assembly 180. Therefore, from the extended orientation of hydraulic cylinder assembly 210 with operating rod 216 extended from cylinder 211, operating arm 216 will retract into cylinder 211 in the direction indicated by the arrowed line T in FIG. 26 pulling first linkage element 181 at axis EE rearwardly along descending pivotal traverse in the direction indicated by the arcuate arrowed line R as previously discussed. As operating rod 216 retracts into cylinder 211, upper end 217 will pivot relative first linkage element 181 along axis EE and upper end 217 and axis EE will move along descending pivotal traverse coincident with distal end 183 of first linkage element and axis BB in the direction indicated by arcuate arrowed line S, with lower end 212 of cylinder to correspondingly pivot about axis DD.

In the extended orientation of linkage assembly 180, operating rod 216 will be fully retracted into cylinder 211. After being fully retracted, hydraulic cylinder assembly 210 may then be actuated for extending operating rod 216 outwardly from cylinder 211 to the extended orientation to move linkage assembly 180 from the extended orientation and back to the retracted orientation. In this manner, with hydraulic cylinder assembly 210 fully retracted, extension of operating rod 216 to the extended orientation for moving linkage assembly 180 to the retracted orientation operates to regenerate hydraulic cylinder assembly 210 prior to initiating the succeeding rearward stroke.

The foregoing physical characteristics of linkage assembly 180 and the actuation thereof by hydraulic cylinder assembly 210 between the retracted and extended orientations impart not only the desired movement of platen 187 between the retracted and extended positions as set forth for clearing hopper 61 of refuse and compacting it firmly into storage body 62, but also occasion unique operative functional characteristics throughout stroke path 190 along the forward stroke and the rearward stroke. In this regard, linkage assembly 180 desirably varies the packing force against platen 187 throughout stroke path 190 for increasing the packing force as platen 187 extends along the rearward stroke to the extended position of platen 187 and decreasing the packing force as platen retracts along the forward stroke to the retracted position of platen 187.

In particular, as hydraulic cylinder assembly 210 retracts from the extended orientation with linkage assembly 180 in the retracted orientation, the speed of platen 187 at the beginning of the rearward stroke will be relatively fast and the maximum packing force available by platen 187 against refuse will be relatively small. However, as hydraulic cylinder assembly 210 retracts and platen 187 extends, platen 187 will move progressively slower increasing and maximizing the available packing force available by platen 187 against refuse as platen 187 progressively traverses along the rearward stroke. After considerable experimentation with the physical orientation of linkage assembly 180 and hydraulic cylinder assembly 210, a plot of the maximum or available packing force as a function of the extending position of platen 187 evinces a substantially hyperbolic curve which grows asymptotically to approach infinity as first and second linkage elements 181 and 182 approach the extended orientation. Because the envelope of the maximum force required to accumulate refuse rearward of platen 187 and then to compress it into the accumulation of previously compacted refuse carried within chamber 74 of storage body 62 plotted as a function of the movement of platen 187 along the rearward or compacting stroke is a similarly shaped curve, the physical configuration of linkage assembly 180 and hydraulic drive assembly 210 impart a distribution of maximum packing force which exceeds the force required to compact or otherwise accumulate refuse within chamber 74 of storage body 62. Accordingly, rather than provide maximum packing force at every location of platen 187 along the rearward stroke, less hydraulic oil may be delivered to cylinder 211 to achieve a given length of travel of platen 187 along the rearward stroke to achieve the maximum packing force by platen 187 against the refuse. As a consequence, the movement of platen along the forward stroke and the rearward stroke defined along stroke path 190 is highly efficient and comparatively fast as compared to conventional packing assemblies currently in use. Due to the maximization of the packing force by platen 187 by linkage assembly 180, more refuse may be packed into storage body 62 for allowing the collection of greater loads of refuse. Furthermore, as hydraulic cylinder assembly 210 extends and platen 187 retracts, the hydraulic oil exiting the cylinder from the rod end may be added to the pumped oil so that the pump must displace only a volume of oil equal to the volume of rod 216 to extend hydraulic cylinder assembly 210 thus further reducing the time required to complete a packing cycle.

With continuing reference to FIG. 26 illustrating platen 187 in vertical cross section and additional reference to FIG. 28 illustrating a perspective view of platen 187, platen 187 is generally comprised of framework 220 including an upstanding panel 221 having a rearward surface 222 directed toward downstream opening 81 (not shown in FIG. 26 and FIG. 28) and a lower edge 223 (not shown in FIG. 26) having a substantially arcuate shape operative to conform to the substantially arcuate shape of bottom panel 71 of storage body 62 and the arcuate shape of floor 174 of hopper 62. Platen 187, preferably constructed of steel or other suitable material having similar structural and functional characteristics, further includes a pair of upstanding sidewalls 224 and 225 (sidewall 225 not shown in FIG. 26) mounted at either lateral side of panel 221 and a transverse support member 226 (shown only in FIG. 26) mounted with panel 221 interconnecting sidewalls 224 and 225. Support member 226 is tubular having a generally square cross section and operates to reinforce and add structural integrity to platen 187, although other suitable reinforcement mechanisms may be used for adding structural integrity to platen 187 if desired. Platen 187 further includes a shield 227 hingedly mounted with an upper edge 228 of panel 221 operative for deflecting refuse and inhibiting refuse from falling in front of platen 187 onto linkage assembly 180 in the retracted position of platen 187 during normal refuse collection operations. The various structural features of platen 187 have been set forth for the purposes of orientation and reference and are not intended to be limiting in light of the nature and scope of the present invention as herein specifically described. In this regard, other suitable platen configurations may be used consistent with the foregoing and ensuing teachings if desired.

In accordance with the preferred teachings herein, platen 187 may be mounted along the fixed path as previously intimated extending from a location proximate upstream end 82 of hopper 61 to proximate downstream opening 81 of storage body 62 to a carriage assembly generally designated by the reference character 230. As generally illustrated in FIG. 26, carriage assembly 230 defines the fixed path along which platen 187 travels extending longitudinally along body 60 from adjacent upstream end 82 of hopper 61 rearward of lower end 182 of hydraulic cylinder assembly 210 and into and through storage body 62 terminating at a location proximate downstream opening 81 of storage body 62 adjacent rearward edge 71D as generally illustrated in combination with FIG. 33.

Figure 33:
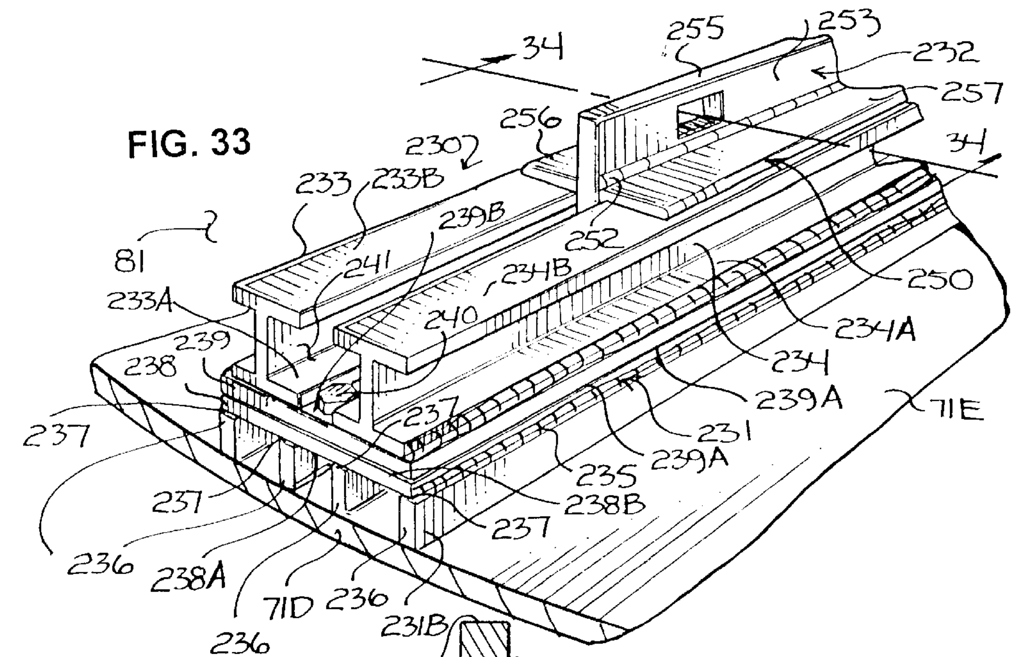
FIG. 33 illustrates a fragmented perspective view of the carriage assembly of FIG. 30 shown as it would appear mounted with a floor or bottom panel of the storage body first shown in combination with FIG. 1, in accordance with a preferred embodiment of the present invention.
Figure 34:
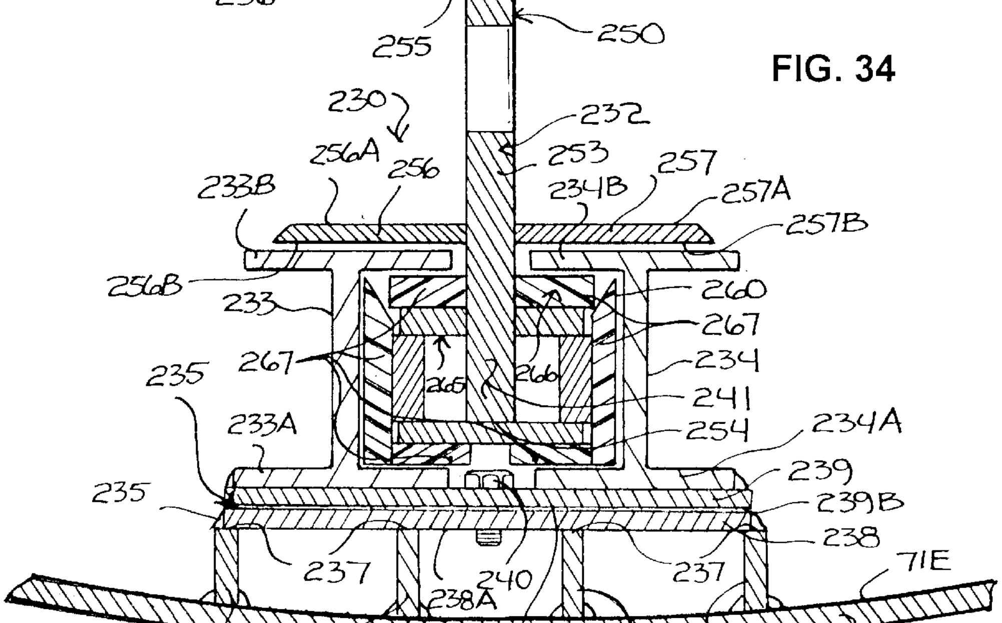
FIG. 34 illustrates a sectional view taken along line 34—34 of FIG. 33, in accordance with a preferred embodiment of the present invention.

With continuing reference to FIG. 33 and additional reference to FIG. 34 illustrating a sectional view taken along line 34—34 of FIG. 33, carriage assembly 230 is generally comprised of a carriage 231 and a carrier element 232 supported and carried by carriage 231 for alternating reciprocal sliding movement. As will be discussed shortly, carrier element 232 may be coupled with platen 187 and to outer end 186 of second linkage element 182 of linkage assembly 180. As a result, carrier element 232 and platen 187 may be moved alternately between retracted and extended positions in response to movement of linkage assembly 180 between the retracted and extended orientations for facilitating the transferal and compaction of refuse from hopper 61 to storage body 62 in the manner previously described.

Preferably constructed of steel or other substantially rigid material, carriage 231 includes substantially coextensive first and second elongate upstanding I-beams 233 and 234 mounted with and carried by a base 235 in spaced apart and substantially parallel relation, I-beams 233 and 234 each having a lower end 233A and 234A mounted with base 235 and extending upwardly therefrom and terminating with an upper end 233B and 234B, respectively. Base 235 is mounted with and carried by floor 174 of hopper 61 and bottom panel 71 of storage body 62 and includes a plurality of substantially coextensive upstanding support elements 236 disposed in spaced apart and substantially parallel relation fixed to and extending upwardly from inner surface 215 of floor 174 (not shown) and inner surface 71E of bottom panel 71 terminating with upper ends 237 mounted with a lower surface 238A of a first plate 238 such as by conventional welding techniques. Further included is a second plate 239 supported by first plate 238 and having a lower surface 239A fixed to and carried by upper surface 238B of first plate 238. Second plate 239 is substantially coextensive with first plate 238 and may be fixedly engaged with first plate 238 by virtue of conventional welding techniques or by perhaps a plurality of conventional threaded fasteners such as fastener 240 shown in FIG. 34. Consistent with a preferred embodiment thereof, carriage 231 is generally intended to include a inner end 231A (FIG. 26) directed toward upstream end 82 of hopper 61 terminating just rearward of lower end 212 of hydraulic cylinder assembly 210 and extends rearwardly therefrom and is generally intended to terminate with an outer end 231B adjacent rearward edge 71D proximate downstream opening 81 as shown in FIG. 33.

Base 235 is operative for supporting I-beams 233 and 234 within hopper 61 and storage body 61. Accordingly, the specific structural features of base 235 are shown merely for the purposes of illustration and are not intended to be limiting features. In this regard, I-beams 233 and 234 are mounted with and supported by upper surface 239B of second plate 239 and reside in spaced apart and substantially parallel relation as previously intimated and cooperate together to define a channel 241 therebetween.

Figure 35:
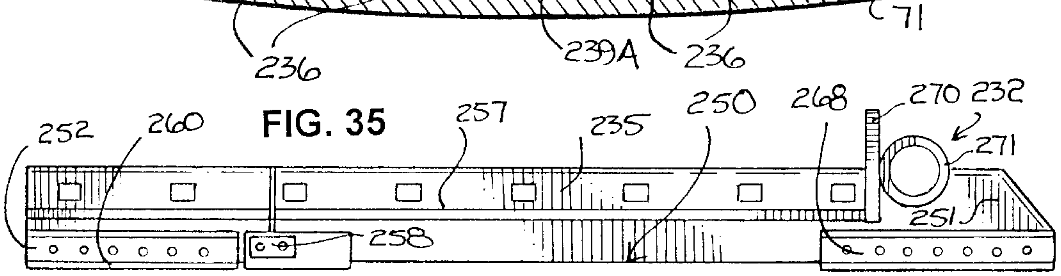
FIG. 35 illustrates a side elevational view of the carrier element of FIG. 30, in accordance with a preferred embodiment of the present invention.

Carrier element 232 is mounted with and carried by I-beams 233 and 234 for alternating reciprocal sliding movement along the length of carriage 231. With attention directed to FIG. 30 illustrating a perspective view of carrier element 232 and additional reference to FIG. 35 illustrating a side elevational view of carrier element 232, carrier element 232 is generally intended to include a forward end 251 and a rearward end 252. Regarding FIG. 30 and FIG. 33, carrier element 232, preferably constructed of steel or other suitable material having similar structural and functional characteristics, is generally comprised of a support member 250 including an elongate upstanding element 253 having a lower edge 254 and an upper edge 255 and a pair of wings 256 and 257 extending laterally outwardly from either lateral side thereof at a point intermediate lower edge 254 and upper edge 255, each wing 256 and 257 including an upper surface 256A and 257A and a lower surface 256B and 257B, respectively. As evidenced in FIG. 30 and FIG. 35, support member 250 is broken at a point inboard of rearward end 252 and includes a joint 258 for reasons presently to appear.

Carried by support member 250 at rearward end 252 of carrier element spaced from lower surfaces 256B and 257B of wings 256 and 257 is a rearward bearing or guide 260. Guide 260 extends forwardly from rearward end 252 of carrier element 232 and terminates at a point rearwardly of joint 258. With attention directed to FIG. 34, guide 260 is generally square in cross section and includes a support structure 265 mounted with upstanding element 253 at point spaced from lower surfaces 256B and 257B of wings 256 and 257, and a bearing structure 266 mounted with, carried by and substantially encompassing support structure 265. Bearing structure 266 is comprised of a plurality of blanks 267 arranged about and coupled with support structure 265, blanks 267 being preferably constructed of molded polyethylene, bronze or other material having similar structural and functional characteristics for reasons presently to appear. Consistent with a preferred embodiment thereof, blanks 267 are preferably detachably mounted with support structure 265 by virtue of conventional threaded fasteners or other similar engagement mechanisms, although this is not an essential feature.

As seen in FIG. 30, also carried by support member 250 at forward end 251 of carrier element spaced from lower surfaces 256B and 257B of wings 256 and 257 is a forward bearing or guide 268. Forward guide 268 is substantially similar and includes substantially the same elements and construction as rearward guide 260, further details of which will not be herein specifically addressed.

As evidenced in FIG. 30 and FIG. 35, wings 256 and 257 extend from rearward end 252 and terminate at a support plate 270. As best illustrated in FIG. 32 showing an enlarged fragmented perspective view of forward end 251 of carrier element 232, support plate 270 extends upwardly from wings 256 (not shown in FIG. 35) and 257 and upstanding element 253 at a point inboard of forward end 251. Located forwardly of support plate of carrier element 232 is a socket 271 operative for pivotally receiving outer end 186 of second linkage element 182 of which may also be seen in FIG. 26.

Carrier element 232 is slidably carried, received or otherwise captured by carriage 231 for alternating reciprocal sliding movement between inner end 231B of carriage to outer end 231B of carriage 231, with forward end 251 of carrier element 232 directed toward inner end 231A of carriage 231 and rearward end 252 of carrier element 232 directed toward outer end 231B of carriage 231. To facilitate sliding movement, carrier element 232 is constructed of a length somewhat less than the length of carriage 231, further details of which will be discussed shortly. Rearward guide 260 and forward guide 268 are sized for sliding receipt into and through channel 241 with lower surfaces 256B and 257B of wings 256 and 257 to slidably rest spaced above upper ends 233B and 234B of I-beams 233 and 234 as shown in FIG. 34. Wings 256 and 257 keep debris out of channel 241. Sliding contact is borne by the plastic or bronze wear surfaces.

With outer end 186 of second linkage element 182 mounted for pivotal movement to socket 271 of carrier element 232, alternating movement of linkage assembly 180 between the retracted orientation and the extended orientation as herein previously described will correspondingly impart alternating reciprocal and sliding movement of carrier element 232 between a retracted orientation and an extended orientation through carriage 231. In this regard, because blanks 267 of bearing structure 266 of rearward guide 260 and similarly constructed forward guide 268 are preferably constructed of formed or extruded polyethylene, UHMW, bronze or other similar substance, forward and rearward guides 260 and 268 desirably operate as bearings providing smooth sliding movement of carrier element 232 through channel 241 as carrier element 232 is moved alternately between retracted and extended orientations.

For the purposes of orientation and reference, carrier element 232 is preferably constructed of a length operative for accommodating the length of stroke path 190 of linkage assembly without emerging outwardly from downstream opening 81 of storage body 62 upon movement of linkage assembly 180 into the extended orientation. In a further and more specific aspect, the preferred length of carrier element 232 is such that in the retracted orientation of linkage assembly 180, forward end 251 of carrier element will desirably reside just rearwardly of lower end 212 of cylinder 211 as illustrated by the dotted outline of carrier element 232 in FIG. 26. Also, in the extended orientation of linkage assembly 180, rearward end 252 of carrier element will reside proximate rearward edge 71E of bottom panel 71 of storage body 62 adjacent downstream opening 81 of storage body 62 without emerging outwardly from downstream opening 81 of storage body 62.

As previously indicated, platen 187 may be mounted with carrier element 232 of carriage assembly 230 such that in response to movement of linkage assembly 180 between the retracted and extended orientations, carrier element 232 will carry platen 187 between the retracted and extended positions for facilitating the transferal and consequent compaction of refuse from hopper 61 to storage body 62. In this regard, a variety of suitable engagement mechanisms may be employed for coupling platen 187 to carrier element 232 without departing from the nature and scope of the present invention as herein specifically described.

Nevertheless, for the purposes of example, to desirably couple platen 187 to carrier element 232, and with attention directed to FIG. 28, platen 187 is provided with and carries a housing 280 located centrally of framework 220 at panel 221 intermediate sidewalls 224 and 225 proximate lower edge 223. As evidenced in FIG. 26, housing 280 defines a chamber 281 forward of panel 221 within which is mounted and carried an engagement mechanism operative for securingly and detachably engaging platen 187 with carrier element 232. With attention directed to FIG. 36 illustrating a sectional view taken along line 36—36 of FIG. 28, mounted with and carried by housing 280 is the engagement mechanism generally designated by the reference character 282. Engagement mechanism 282 is located laterally adjacent an inverted generally U-shaped tunnel 283 formed through a forward endwall 284 of housing 280, forward endwall 284 being also shown in FIG. 26 against which may bear support plate 270. For the purposes of orientation, FIG. 26, FIG. 28 and FIG. 29 illustrates housing 280 having a rearward endwall 285. In this regard, forward endwall 284 of housing 280 is located forwardly and spaced from rearward endwall 285 thus cooperating in part to define chamber 281. As seen in FIG. 36, a notch 286 is formed through forward endwall 284 upwardly from and communicating with tunnel 283.

Consistent with the foregoing, platen 187 is mounted upon carriage assembly 230 with carriage 231 and carrier element 232 received into and through tunnel 283 with notch 286 operative for freely receiving the portion of upstanding element 253 extending upwardly from wings 256 and 257 in the direction toward upper edge 255. Like forward endwall 284, and with momentary reference to FIG. 29, rearward endwall 285 also includes a notch 287 extending upwardly therethrough operative for also freely receiving that portion of upstanding element 253 extending upwardly from wings 256 and 257 in the direction toward upper edge 255 thus, in combination with forward endwall 284, cooperating together to adapt housing 280 to freely receive carriage assembly 230 in the foregoing manner.

With continuing reference to FIG. 36, engagement assembly 282 is comprised of a conventional air-operated hydraulic cylinder assembly 290 including a cylinder 291 having an inner end 292 mounted with housing 280 and an operating rod 293 mounted partially within cylinder 291 for reciprocal movement therein indicated by the double arrowed line U and terminating with an upper end (not shown) mounted with a pin 294 extending inwardly into chamber 281 opposing notch 286. Although a variety of mechanical engagement mechanisms may be used for mounting inner end 292 of cylinder to housing, the present example shown in FIG. 36 illustrates inner end 292 of cylinder 291 mounted with a bifurcated bracket 295 carried by and mounted with housing 280, although this is not an essential feature. Pin 294 extends through and is captured by a guide 300 carried by a fixture 301 positioned within housing 280 adjacent tunnel 283 and captured between forward endwall 284 and rearward endwall 285 (rearward endwall 285 not shown in FIG. 36).

Preferably constructed of steel or other material having similar structural and function characteristics, fixture 301, as best shown in FIG. 37, includes a base 302 formed generally in the shape of a block. Base 302 includes an upper surface 303 upon which is mounted, preferably by welding, guide 300. Guide 300 includes a pair of spaced apart upstanding sidewalls 304 and 305 extending upwardly from upper surface 303 terminating with an upper panel 306 cooperating together to bound a passageway or bore 307 therethrough communicating with a trench 308 bound and defined by a pair of spaced apart upstanding sidewalls 309 and 310 coupled with and extending upwardly from upper surface 303, trench 308 running substantially perpendicular to bore 307. As shown in FIG. 37, sidewall 309 further includes an aperture 311 formed therethrough. and diametrically opposed with bore 307 and operative for receiving pin 294 therethrough, further details of which will be presently discussed.

With attention directed back to FIG. 36, and with carriage assembly 230 positioned into and through tunnel 283 and notch 286 as previously discussed, fixture 301 is carried within chamber 281 of housing 280 in a generally inverted orientation and desirably rests upon carriage assembly 230 with upstanding element 253 received into and through trench 308 and pin 294 extending into and through bore 307 of guide 300. In this manner of orientation, pin 294 directly opposes upstanding element 253 as shown.

With momentary reference back to FIG. 30, to desirably engage platen 187 to carrier element, upstanding element 253 is provided with a plurality of apertures 312 extending therethrough and disposed therealong from a point just rearward of support plate 270 to proximate rearward end 252. Cylinder assembly 290 may thus be actuated for urging operating rod 293 into an extended orientation to correspondingly urge pin 294 outwardly in the direction of the arrowed line V in FIG. 36 to pass pin 294 through bore 307, into trench, through one of the plurality of apertures 312 of upstanding element 255 aligned with pin 29A and through aperture 311 carried by sidewall 309 of fixture 301. Upon movement of pin 294 into the extended orientation in the foregoing manner, platen 187 thus becomes fixed to carrier element 232. With fixture 301 captured within housing 280 between forward endwall 284 and rearward endwall 285, actuation of linkage assembly between the retracted and extended orientations will cause platen 187 to correspondingly move coincident with the movement of carrier element 232 in response to actuation of linkage assembly 180 between the retracted and extended orientations. In this regard, during movement of linkage assembly 180 along the forward stroke, base 302 of fixture will bear against forward endwall 284 to force platen 187 to move along the forward stroke as carrier element 232 traverses along the forward stroke as defined by stroke path 190 (FIG. 26) coincident with the actuation of linkage assembly 180. Furthermore, during movement of linkage assembly 180 along the rearward stroke, base 302 of fixture will bear against rearward endwall 285 to force platen 187 to move along the rearward stroke as carrier element 232 traverses along the rearward stroke as defined by stroke path 190 (FIG. 26) coincident with the actuation of linkage assembly 180.

In the fully retracted position of platen 187 along carrier element 232 proximate forward end 252, pin 294, operative as an engagement element, may be engaged with aperture 312, operative as a complemental engagement element, located just rearward of support plate 270. Accordingly, with platen 187 mounted with carrier element 232 in this fashion, movement of linkage assembly 180 to the retracted orientation will define a fully retracted orientation of platen 187 within hopper 61. In this fully retracted orientation of platen 187, refuse may properly be collected and placed within hopper 61 rearwardly of platen 187 adjacent rearward surface 222 of panel 221. Once collected, a user may then actuate linkage assembly 180 into the extended orientation for transferring and packing refuse from hopper 61 and into storage body 62 and then back to the retracted orientation for allowing refuse to be deposited into hopper 61 prior to initiating a succeeding forward stroke.

Because carrier element 232 includes the plurality of spaced apart apertures 312 located along substantially the entire length of carrier element 232 as previously discussed, carrier assembly 232, engagement mechanism 282 and platen 187 may be properly employed to move platen 187 alternately and incrementally along forward stroke and rearward stroke movement of linkage assembly 180 into and through storage body 62. In this manner, engagement mechanism 282 and carrier element 232 may be employed for moving platen 187 incrementally along rearward stroke movement of linkage assembly 180 from proximate upstream end 82 of hopper 61 to proximate downstream opening 81 of storage body 62 for facilitating the ejection of refuse outwardly through downstream opening 81 for allowing the efficient deposit of the refuse contained within storage body 62 at a suitable refuse disposal facility.

For instance, with platen 187 coupled with carrier element 232 via engagement mechanism 282 and fixture 301 in the fully retracted position of platen 187 proximate forward end 252 of carrier element 232 as previously described, linkage assembly 180 may be actuated from the retracted orientation along the rearward stroke to the extended orientation for correspondingly moving platen 187 from the fully retracted position to an extended position for transferring refuse from hopper 61 through upstream opening 80 of storage body 62. At this point, cylinder assembly 290 may be actuated for retracting operating rod 293 inwardly as indicated by the arrowed line w in FIG. 36 to move pin 294 along the same directional traverse to disengage pin 294 from the selected aperture 312 for consequently disengaging engagement assembly 282 from carriage element 232 thereby disengaging platen 187 from carrier element 232.

With platen 187 disengaged from carrier element 232, linkage assembly 180 may be actuated from the extended orientation to the retracted orientation pulling carrier element 232 along carriage 231 toward upstream end 82 of hopper 61, platen 187 remaining in a stationary position and carrier element 232 sliding forwardly within tunnel 283 and notch 286. Upon movement of linkage assembly 180 into the retracted orientation, cylinder assembly 290 may be actuated for moving operating rod 293 outwardly in the direction indicated by the arrowed line V in FIG. 36 to engage another aperture 312 of carrier element located forwardly of the aperture 312 positioned adjacent support plate 270 to re-engage platen 187 to a new position along the length of carrier element 232 intermediate forward end 251 and rearward end 252 of carrier element 232. Once re-engaged, linkage assembly 180 may be actuated along its rearward stroke for facilitating the movement of platen 187 rearward throughout the rearward stroke of linkage assembly 180 into and through storage body 62 a distance equal to path stroke 190. This process may be repeated until platen 187 is finally positioned adjacent downstream opening 81 of storage body 62 resulting in the incremental and downstream traverse of platen 187 from upstream end 82 of hopper 61 to downstream opening 81 of storage body 62 for facilitating the transfer and ejection of refuse outwardly through downstream opening 81.

In order for the foregoing process of ejecting refuse outwardly from downstream opening 81 by packer assembly 170 to be desirably carried out, closure element 91 of gate assembly 90 will need to be in the open position for facilitating the ejection of refuse outwardly from downstream opening 81. Furthermore, to prevent rearward end 252 of carrier element 232 from retracting inwardly through housing 280, rearward end 252 may be provided with a stop 313 carried by upstanding element 253 as shown in FIG. 31 and constructed of a size sufficient not to admit past notch 287 of rearward endwall 285 of housing 280. Although a variety of stops may be used, stop 313 is comprised of a nut 314 mounted with upstanding element 253 at rearward end 252 of carrier element 232 and a bolt 315 threadably and detachably receivable by nut 314.

From the foregoing discussion, it will be readily understood that platen 187 may be selectively and repeatedly engaged with carrier element 232 during rearward stroke movement of linkage assembly 180 and disengaged from carrier element 232 during forward stroke movement of linkage assembly 180 for facilitating movement of platen 187 from upstream end 82 of hopper 61 to downstream opening 81 of storage body 62 throughout consecutive rearward stoke actuation of linkage assembly 180. To reacquire platen 187 in the fully retracted position within hopper 61 from adjacent downstream opening 81, platen may be selectively and repeatedly engaged with carrier element 232 during forward stroke movement of linkage assembly 180 and disengaged from carrier element 232 during rearward stroke movement of linkage assembly 180 for facilitating the incremental movement of platen 187 along consecutive forward strokes of linkage assembly 180 from downstream opening 81 of storage body 62 to adjacent upstream end 82 of hopper 61. Although not herein specifically shown, the controls for controlling the operation of engagement mechanism 282 may be suitably located within cab 59 of vehicle if desired for allowing the operator of vehicle 50 to actuate hydraulic cylinder assembly 290 between the extended and retracted orientations as desired consistent with the preferred operation of hydraulic cylinder assembly 290 as herein specifically discussed.

The number of rearward stokes and corresponding forward stokes of linkage assembly 180 to move platen alternately between upstream end 82 of hopper 61 to downstream opening 81 of storage body 62 may vary depending upon the length of body 60. Furthermore, apertures 312 of carriage element 232 may be desirably and selectively positioned along the length of carriage element 232 at locations sufficient to cause the desired alignment of pin 294 of engagement mechanism 282 with selected ones of apertures 312 throughout the alternating engagement of engagement mechanism 282 with carrier element 232 throughout forward stroke and rearward stroke movement of linkage assembly 180.

Because the force imparted against the refuse by platen 187 may be considerable as a result of the high degree of packing force occasioned by the desired operation of linkage assembly 180, joint 258 allows carrier element 232 to pivot and give at joint 258 for inhibiting carrier element 232 from becoming compromised during the compaction operations. Furthermore, because the blanks of the rearward and forward guides 260 and 268 may tend to wear over an extended period of time, the preferred detachably mounting of blanks allows a user to selectively replace the blanks as needed as they become worn as a result of the continued sliding movement of the forward and rearward guides 260 and 268 through channel 241. Furthermore, and as evidenced in FIG. 29, platen 187 may be provided with a pair of opposed guide rails 315 and 316 (also shown in FIG. 36 in vertical cross section) coupled with framework 220 and extending rearwardly from housing 280 of platen 187 in spaced apart, substantially coextensive and substantially parallel relation. In operation, guide rails 315 and 316 are sized for receipt against either lateral side of each respective I-beam 233 and 234 operative for guiding platen 187 along carrier element 232, although this is not an essential feature.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A vehicle of a type including a body mounted with a chassis for receiving refuse, the body comprising:

an integral outwardly arcuate top panel having opposing side edges, a forward edge and a rearward edge, a bottom panel, a first integral outwardly arcuate side panel having opposing side edges, a forward edge and a rearward edge, and a second integral outwardly arcuate side panel having opposing side edges, a forward edge and a rearward edge, the first side panel and the second side panel directly joined to the opposing side edges of the top panel, and cooperating together to bound a chamber for carrying refuse, the forward edges of the panels bounding an opening into the chamber for receiving refuse therethrough and the rearward edges of the panels bounding another opening into the chamber.

2. The body of claim 1, wherein one of the opposing side edges of the first integral outwardly arcuate side panel is coupled with the integral outwardly arcuate top panel at a point adjacent to and generally underlying one of the opposing side edges of the top panel to define an upper corner of the body.

3. The body of claim 2, wherein one of the opposing side edges of the second integral outwardly arcuate side panel is coupled with the integral outwardly arcuate top panel at a point adjacent to and generally underlying another of the side edges of the top panel to define another upper corner of the body.

4. The body of claim 1, wherein the bottom panel includes a side edge coupled with the first integral outwardly arcuate side panel at a point adjacent to and generally overlying the other of the opposing side edges of the first integral outwardly arcuate side panel to define a lower corner of the body.

5. The body of claim 4, wherein the bottom panel includes another side edge coupled with the second integral outwardly arcuate side panels at a point adjacent to and generally overlying another of the opposing side edges of the second integral outwardly arcuate side panel to define another lower corner of the body.

6. The body of claim 1, further including a gate assembly including a closure element mounted to serve as a closure for the other opening of the body and movable between normal closed and opened positions.

7. The body of claim 6, wherein the gate assembly further includes:

the closure element having an inner end to enclose the other opening of the body in the normal closed position of the closure element;

an engagement assembly carried by the closure element;

a complemental engagement assembly carried by the body, the engagement assembly being detachably engagable with the complemental engagement assembly in the normal closed position of the closure element;

motive means for moving the closure element from the normal closed position to the open position along general ascending traverse to disengage the engagement assembly from the complemental engagement assembly and for moving the closure element along general ascending pivotal traverse for disengaging the inner end of the closure element from the other opening of the body, and for moving the closure element from the open position to the normal closed position along general descending pivotal traverse for engaging the inner end of the closure element with the other opening of the body and for moving the closure element along general descending traverse to engage the engagement assembly with the complemental engagement assembly in the normal closed position of the closure element.

8. The body of claim 7, wherein the motive means includes a plurality of drive assemblies disposed in spaced relation, each one of the plurality of drive assemblies including:

a stop carried by the closure element;

a linkage element pivotally mounted with the body and the closure element;

actuating means for moving the linkage element along general ascending pivotal traverse relative the body for moving the closure element from the closed position along general ascending traverse to disengage the engagement assembly from the complemental engagement assembly and subsequently engage the stop for imparting movement of the closure element along general ascending pivotal traverse disengaging the inner end of the closure element from the other opening of the body and moving the closure element to the open position, and for moving the linkage element in general descending pivotal traverse relative the body from the open position of the closure element for moving the closure element in general descending pivotal traverse to engage the inner end of the closure element with the other opening of the body with the linkage element to subsequently disengage the stop for moving the closure element in general descending traverse to engage the engagement assembly with the complemental engagement assembly in the normal closed position of the closure element.

9. The body of claim 8, wherein the actuating means includes a hydraulic cylinder assembly having an inner end pivotally mounted with the body and an outer end pivotally mounted with the linkage element, such that upon actuation of the hydraulic cylinder assembly, the closure element may be moved alternately between the normal closed and open positions.

10. The storage body of claim 9, wherein the hydraulic cylinder assembly comprises:

a cylinder having the inner end mounted with the body; and an operating rod mounted partially within the cylinder for movement in reciprocal directions and terminating with the outer end mounted with the linkage element, an extended orientation of the operating rod corresponding to the normal closed position of the closure element and a retracted orientation of the operating rod corresponding to the open position of the closure element.

11. The body of claim 7, wherein the engagement assembly includes a plurality of spaced-apart hook elements.

12. The body of claim 11, wherein the complemental engagement assembly includes a plurality of spaced-apart pins.

13. For use with a vehicle of a type having a body carried by a chassis for receiving and storing refuse, a gate assembly, comprising:

a closure element mounted to serve as a closure for an opening of the body and movable from a normal closed position to an open position, and from the open position to the normal closed position, the closure element having an inner end to enclose the opening of the body in the normal closed position;

an engagement assembly carried by the closure element;

a complemental engagement assembly carried by the body, the engagement assembly being detachably engagable with the complemental engagement assembly in the normal closed position of the closure element;

a stop carried by the closure element;

a linkage element pivotally mounted with the body and the closure element; and a hydraulic cylinder assembly generally horizontally mounted to a top rear portion of the body, and having an inner end pivotally mounted with the body and an outer end mounted with the linkage element for moving the linkage element along general ascending pivotal traverse relative the body for moving the closure element from the closed position along general ascending traverse to disengage the engagement assembly from the complemental engagement assembly with the linkage element to subsequently engage the stop for imparting movement of the closure element along general ascending pivotal traverse disengaging the inner end of the closure element from the opening of the body and moving the closure element to the open position, and for moving the linkage element in general descending pivotal traverse relative the body from the open position of the closure element for moving the closure element in general descending pivotal traverse to engage the inner end of the closure element with the opening of the body with the linkage element to subsequently disengage the stop for moving the closure element in general descending traverse to engage the engagement assembly with the complemental engagement assembly in the normal closed position of the closure element.

14. The gate assembly of claim 13, wherein the hydraulic cylinder assembly comprises:

a cylinder having the inner end mounted with the body; and an operating rod mounted partially within the cylinder for movement in reciprocal directions and terminating with the outer end mounted with the linkage element, an extended orientation of the operating rod corresponding to the normal closed position of the closure element and a retracted orientation of the operating rod corresponding to the open position of the closure element.

15. The gate assembly of claim 13, wherein the engagement assembly includes a plurality of spaced-apart hook elements.

16. The gate assembly of claim 15, wherein the complemental engagement assembly includes a plurality of spaced-apart pins.

17. A method of fabricating a refuse collection vehicle, the method comprising the steps of:

providing a wheeled chassis;

providing an integral outwardly arcuate top panel having opposing side edges, a forward edge and a rearward edge, a bottom panel, a first integral outwardly arcuate side panel having opposing side edges, a forward edge and a rearward edge, and a second integral outwardly arcuate side panel having opposing side edges, a forward edge and a rearward edge;

directly joining the one of the opposing side edges of the first side panel and the second side panel to the opposing side edges of the top panel, so they cooperate together to bound a chamber for carrying refuse, the forward edges of the panels bounding an opening into the chamber for receiving refuse therethrough and the rearward edges of the panels bounding another opening into the chamber; and mounting the bottom panel with the chassis.

18. The method of claim 17, wherein the step of directly joining further includes the step of bonding the one of the opposing side edges of the first integral outwardly arcuate side panel with the integral outwardly arcuate top panel at a point adjacent to and generally underlying one of the side edges of the top panel to define an upper corner of the body.

19. The method of claim 18, wherein the step of providing a body still further includes the step of bonding the one of the opposing side edges of the second integral outwardly arcuate side panel with the integral outwardly arcuate top panel at a point adjacent to and generally underlying the other of the side edges of the top panel to define another upper corner of the body.

20. The method of claim 19, wherein the step of providing a body further includes the step of bonding a side edge of the bottom panel with the first integral outwardly arcuate side panel at a point adjacent to and generally overlying the other of the opposing side edges of the first integral outwardly arcuate side panel to define a lower corner of the body.

21. The method of claim 20, wherein the step of providing a body still further includes the step of bonding another side of the bottom panel with second integral outwardly arcuate side panel at a point adjacent to and generally overlying the other one of the opposing side edges of the second integral outwardly arcuate side panel to define another lower corner of the body.

* * * * *